(12) United States Patent
Zubov et al.

(10) Patent No.: US 10,911,237 B2
(45) Date of Patent: Feb. 2, 2021

(54) VIRALLY CONNECTED NETWORK OF PEOPLE AS A MEANS TO RECOVER ENCRYPTED DATA SHOULD THE ENCRYPTION KEY BECOME LOST

(71) Applicants: Jim Zubov, Buffalo, NY (US); John Kenneth Brixius, Buffalo, NY (US)

(72) Inventors: Jim Zubov, Buffalo, NY (US); John Kenneth Brixius, Buffalo, NY (US)

(*) Notice: Subject to any disclaimer, the term of this patent is extended or adjusted under 35 U.S.C. 154(b) by 173 days.

(21) Appl. No.: 15/917,341

(22) Filed: Mar. 9, 2018

(65) Prior Publication Data
US 2018/0262337 A1  Sep. 13, 2018

Related U.S. Application Data

(60) Provisional application No. 62/469,966, filed on Mar. 10, 2017.

(51) Int. Cl.
*H04L 9/32* (2006.01)
*G06F 21/60* (2013.01)
*H04L 9/08* (2006.01)
*G06F 11/14* (2006.01)
*G06F 21/62* (2013.01)

(52) U.S. Cl.
CPC ........ *H04L 9/3226* (2013.01); *G06F 11/1469* (2013.01); *G06F 21/602* (2013.01); *G06F 21/6245* (2013.01); *H04L 9/085* (2013.01); *H04L 9/0863* (2013.01); *H04L 9/0894* (2013.01); *H04L 9/3213* (2013.01); *G06F 2201/84* (2013.01)

(58) Field of Classification Search
CPC .... G06F 11/1469; G06F 21/31; G06F 21/602; G06F 21/6209; G06F 21/6218; G06F 21/6245; G06F 2201/84; G06F 2221/2107; H04L 63/0428; H04L 63/0442; H04L 63/083; H04L 63/105; H04L 9/0825; H04L 9/085; H04L 9/0861; H04L 9/0863; H04L 9/0894; H04L 9/14; H04L 9/3213; H04L 9/3226
See application file for complete search history.

(56) References Cited

U.S. PATENT DOCUMENTS

| | | | |
|---|---|---|---|
| 10,013,682 B2* | 7/2018 | Bianchi | G06F 21/6245 |
| 2015/0365385 A1* | 12/2015 | Hore | H04L 63/06 |
| | | | 713/152 |
| 2016/0140335 A1* | 5/2016 | Proulx | G06F 21/45 |
| | | | 726/6 |
| 2016/0212082 A1* | 7/2016 | Bhavnani | H04L 63/0414 |

OTHER PUBLICATIONS

Adi Shamir. 1979. How to share a secret. Commun. ACM 22, 11 (Nov. 1979), 612-613. DOI:https://doi.org/10.1145/359168.359176 (Year: 1979).*

* cited by examiner

*Primary Examiner* — Christopher Biagini
(74) *Attorney, Agent, or Firm* — FisherBroyles, LLP

(57) ABSTRACT

A means of using a virally connected network of friends to assist each other to recover encrypted data should any single person lose their encryption key, without noticeably risking the security of the encrypted data to any persons with access to the encrypted data or to the Internet, including the virally connected network of friends.

16 Claims, 15 Drawing Sheets

VIRALLY CONNECTED NETWORK OF PEOPLE AS A MEANS TO RECOVER ENCRYPTED DATA SHOULD THE ENCRYPTION KEY BECOME LOST

REFERENCE

U.S. PTO Provisional Application 62/469,966 "A VIRALLY CONNECTED NETWORK OF PEOPLE AS A MEANS TO RECOVER ENCRYPTED DATA SHOULD THE ENCRYPTION KEY BECOME LOST" Jim Zubov, John Brixius Mar. 10, 2017

FIELD OF THE INVENTION

The present invention is in the technical field of computer data security. More particularly, the present invention is in the technical field of overcoming the shortfalls of using encryption or similar methodologies as a means to protect electronically stored or streamed data of any kind, through any means. More particularly, the present invention is in the technical field of using social networks as a means to safeguard against the inability of the rightful owners or Users of any kind of electronically or digitally stored encrypted or protected data to decrypt or unlock and access the data should they lose the encryption key or any type of key that descrambles the data

BACKGROUND OF THE INVENTION

In general, for the purposes of understanding the invention, there are currently three generic methods of protecting electronically or digitally stored data: (1) Denial of Physical Access; (2) Electronic Firewall; and (3) Data Encryption. Each of these methods can be used separately, or in combination with each other. Used separately, each of these methods has its advantages and disadvantages that limit their applicability as well as effectiveness.

The Denial of Physical Access method is simply restricting access to the physical storage device itself, where the storage device is generally, but not always, not connected to the Internet or any other electronic Network and thus cannot be accessed through any remote, electronic means requiring the use of a Network. The only way to steal the data is to gain actual physical possession of the storage device itself and then to either electronically Hack into the software that manages the data, or to physically access the data from the storage device.

The key benefit to using the Denial of Physical Access method is it eliminates the possibility of a data breach through a connected Network, which is, by far, the biggest security threat. If the device is kept safe, then there is little to no chance of Hacking into it through the Network.

The disadvantages of the Denial of Physical Access method are numerous. First, in today's interconnected world, it is almost impossible to have an electronic storage device that is completely disconnected to other computers throughout its lifetime of use. Even if the device itself is always directly isolated from the Internet, at times, it is probably connected to a computer when the User is accessing the device, where the computer has had, does have, or will have Internet connectivity. Second, if the storage device is lost, damaged, stolen or fails, the User completely loses the data. Since many storage devices have a finite life, for a long enough time period, the possibility of physical failure and hence loss of data becomes 100%. Secondary backup devices offer some protection against data loss but are still not 100% reliable and require a higher level of effort to maintain. Lastly, with the mass movement to the convenience of cloud-based storage, the Denial of Physical Access method is becoming increasingly inapplicable as the available services are migrating to the Cloud model, and Users want immediate access to their data regardless of where they are located.

The Electronic Firewall method of data protection is based on restricting electronic access to data to ensure only the appropriate persons have electronic access. The firewall is like a "front door" with a guard, with a crowd of people outside the front door comprised of a mix of a few who rightfully should have access and many who should not. The guard assesses each individual who attempts to gain access before granting any access to the data. Once past this front door, the User, or Hacker posing as the User, has access to everything the system has appropriated to the User.

Typically, Electronic Firewall is accomplished via a Username and Password, whereby the Password is kept secret by the User. Once the correct Username and Password are entered, complete access is granted. If either the Username or Password are not entered correctly, the person is denied access. While Usernames are semi-public information, Passwords are not. Passwords are kept private with only the Users knowing what they are. (In most cases, the Service Provider has an algorithm that can validate the Password once entered, but the Service Provider does not generally store the Password.) As long as the Password remains unavailable, Hackers cannot pass through this front door of the system (i.e., they cannot log in pretending to be the User). Two factor authentication, which requires the User to possess a second device or method of validating their identify in concurrence with the login, is sometimes used to complement the Username and Password method, strengthening the security of this method.

The advantages of the Electronic Firewall method are numerous, and because so, it has become the most common method of security protection. First, it shifts almost all of the effort and responsibility of maintaining security from the User to the Service Provider. The User is generally only required to remember his Username and Password. In fact, even this responsibility has been offloaded from the User as the User's Internet Browser (Browser) has the functionality to store and recall these items as needed. Additionally, if Users forget their Passwords, the Service Providers have built-in means for Users to establish their identity and reset their Passwords. The Service Provider bears full responsibility to guard against all back door Hacking attempts, which is a major undertaking.

Second, compared to the other two methods, the User's risk of losing her data is much lower with Electronic Firewall method. Service Providers have distributed hardware systems and redundant back-ups to the point there is a much lower chance of losing data due to hardware failure. Additionally, as previously mentioned, the User need not worry about losing her data if she loses her Password. Third, there is a much lower risk of a data breach through the acquisition of the physical storage device compared to Denial of Physical Access method, despite this risk still being marginally present, because Service Providers generally use large server farms and can afford more effective physical security measures. Fourth, this method is, by far, the most convenient for Users. It rarely requires the User to even enter her Username and Password—because her Browser does it for her—and the User can access her data using any of her personal computer devices, including smart phones, anywhere there is Internet access.

The disadvantages of the Electronic Firewall method are significant, but generally all pertain to security, and there are no significant disadvantages in User convenience or risk of data loss. First, the most common form of Electronic Firewall security, Username and Password, has significant risks of Hacking through the front door. (And while two factor authentication can significantly reduce the risk, the requirement of always having the second factor handy limits the applicability of its use.) Most Users use Passwords that are not that strong, and hence are easy to Hack compared to when an appropriate Password is used. Also, Users commonly use the same Password, or slight variations of it, for many or all of their Apps in the Cloud, raising the risk that a successful Hack in one cloud-based App will result in the ability to easily Hack into many others with which Users generally use the same, usually publicly known, Username. Second, the risk of back door Hacking is quite high as well. Much of the Service Provider's effort to maintain security focuses on back door Hacks, which occur with fairly alarming regularity.

Another problem with Electronic Firewall is that the Administrators of the Service Provider generally have full, unrestricted access to all data for all Users of their system. There is an assumed trust between the User and the Service Provider that the Administrators the Service Providers employs will not abuse their access to this information. Even if the Administrators always act in good faith, granting them unfetter access opens an additional risk to Hacking in that if a Hacker can identify the Username and Password for an Administrator, as opposed to a User, the Hacker will have much wider access to all the data in the system across all Users.

Still another backend Hacking problem resides with the third party software solutions the Service Provider uses in implementing their service. While the custom software of the Service Provider itself may be secure, the Service Provider generally also uses publicly available software which the Service Provider has much less ability to verify and safeguard. In this case, Hackers may gain access to User data through a Hack in the third party software. The Service Provider may not even know the Hack has occurred. There are other Hacking approaches, such as, but not limited to, phishing, which also pose problems.

The third method of security, Data Encryption, encrypts (scrambles) the actual data, which can only be decrypted (unscrambled) by use of an Encryption Key (EK), whereby the only person who is suppose to be in possession of the EK is the owner of the data, the User. Even if the Service Provider stores the data, the Service Provider shouldn't be in possession of the EK, and as such the Administrators of the Service Provider have no access to the data. The encrypted data could be stored in a completely open, read-only access, to the entire world population and there would still be no risk that the data would become unencrypted and usable. Thus, it's more critical, in terms of protecting the privacy of the data, to protect the EK to the encrypted data than it is to restrict access to the data while it is in an encrypted state, assuming the risk of altering or deleting the encrypted file is not an issue. This is very different from the Electronic Firewall and Denial of Data Access methods.

Data Encryption has a very significant advantage over the other two methods: it is, by far, the most secure method in terms of protecting the data itself from unauthorized access. In fact, the data is essentially at no risk at all—as long as there are measures so that the data cannot be altered, deleted or denied to the User, there is no need to restrict access to the data. Being in an encrypted state, the data is not usable in any way, making it unnecessary to use either Electronic Password or Denial of Physical Access in conjunction with Data Encryption, again, as long as the data cannot be altered or deleted. Data Encryption is essentially 100% secure from Hacking (assuming the current paradigms of computing power are maintained) as long as the EK itself is maintained in a secure fashion.

The actual EK is the computer language counterpart to a human language version in the form of a Passphrase. The Passphrase is what the User actually manually types on the keyboard. The computer converts the Passphrase in real-time to computer language, which is an actual, unique EK. This EK itself is generally not stored in the computer. Thus, the User does not possess the EK in computer language format. Rather, the User is in possession of the Passphrase that generates the associated EK. Unless otherwise specified, for the purposes of this document, the term Master Key (MK) will be used interchangeably for both the Passphrase the User manually enters by such activities as typing on a keyboard, as well as the unique EK which it generates. Also, the EK generated by the Passphrase may be the actual EK used to encrypt and decrypt the data, or it may be used to encrypt other EKs that in turn are used to encrypt or decrypt the data. But, because the MK is needed for any of the decryption to occur, all data is secure as long as the MK is secure.

The MK cannot be kept by the Service Provider because doing so would mean that the MK itself would be kept unencrypted and protected only by an Electronic Firewall, which realistically offers no more protection than simply having regular Electronic Firewall without encryption. If a Hacker were to break through the Electronic Firewall, it wouldn't matter if the data were encrypted or not as the MK would be available to unlock any data that happened to be encrypted.

Data Encryption has only one notable disadvantage—the User is solely responsible for maintaining the MK, and if the User loses the MK, the data itself is essentially unrecoverable.

By virtue of the fact that Data Encryption is not commonly used while Electronic Firewall, contrastingly, is very common, it appears that Data Encryption's single disadvantage—risk of unrecoverable data by losing the MK—vastly outweighs its attribute of far superior data security. This drawback is so strong that it appears to have kept the use of Data Encryption to a minimum.

Common practices with email highlight the tradeoffs in Data Encryption. While it is fairly common that an email is encrypted while in transit between outgoing and incoming email servers, it is extremely rare the email remains encrypted once it is stored at the destination server of the recipient, the incoming email server. The reason for this paradox lies in the ownership of responsibility for decryption. It is easy to automate encryption and decryption for an email while in transit because the process is closed to human intervention and the sending and receiving computers can be relied upon to never lose the EK. However, once the process is open to human intervention and humans must be relied upon to enter the MK—which would occur because the MK would need to be entered at the time the human decides to read the email, necessitating either that the human manually enters the MK or having the MK stored by the system—negates the benefit of encryption as the risk of MK loss by humans is present in the process. An email stored on a server is essentially the same as any other stored data, with the same problems in using a MK—it's senseless for the Service Provider to store the MK, and the risk of loss is too high to entrust the MK to the User. Subsequently, the safe bet is the email is automatically decrypted when it arrives at the destination server and then the Electronic Firewall becomes the sole means of security. Ideally, if the User could be trusted to not lose the MK, the email would remain encrypted until the User is ready to read the email, at which time the User would manually enter his MK to decrypt the email real-time for viewing and then discard it once finished.

The current state of data security shows that if there were a way to use Data Encryption without risk of the User losing access to their data by losing the MK, it would be a major improvement in data security.

SUMMARY OF THE INVENTION

It is the primary objective of the present invention to allow for the use of data encryption without the risk of the User losing access to his data by losing his MK. However, the overall scope of the invention goes beyond safeguarding against the risk of losing a MK for encryption and can be extended to the use of Passwords for the Electronic Firewall method, and other methods and processes such as Scrambled Tokens in the Scramble process, which is outlined in the main body of this document. It applies to all forms of electronic data, stored or streamed, including but not limited to text, audio, video, image or 3D. The invention applies to a wide range of formats such as, but not limited to, email, audio, text message, group chat, streamed consumed content, streamed video calling, and stored files that exist or are transmitted on any networked medium such as, but not limited to, the Internet, any physical media or electromagnetic spectrums such as radio waves, and hardwired connections.

The present invention is an electronic process and means of using a Virally Connected Network of Friends (VCNOF) as a backup and redundancy to Recover a private or secret Recovery Key (RK), whereby this RK can be a Password, a Scrambled Token or other information, but is primarily an EK. The general purpose of the RK is to decrypt and make accessible other more valuable, primary information kept secret and safe through encryption. The RK is used in the event that the owner has forgotten or lost her MK and cannot otherwise decrypt her primary data. In such an event, the User communicates to all her Friends in her VCNOF that her MK has been lost. If a predetermined number of Friends elects to assist the User, which includes entering their MKs, the RK is generated and given to the User so that she can recover her data. Assuming single person Recovery where it only takes a single Friend's assistance to achieve Recovery, as long as any Friend in the VCNOF has not lost his MK, that Friend can use it to decrypt the User's RK that has been stored in his personal account, and re-share it back with the User to achieve Recovery. Furthermore, each RK can be scrambled to a point that descrambling the RK is as difficult as brute force breaking the encryption, and thus even the Friends themselves cannot use it, assuming it ever fell into their possession. As the VCNOF grows, the odds the original User is not connected to any single Friend who can initiate the chain reaction of Recovery rapidly approaches zero percent. Thus, this invention provides all the benefits of encryption without the risk of the User losing access to her encrypted data due to losing her MK, by being able to Recover an RK through VCNOF who re-share the RK with the User to Recover the lost data.

DETAILED DESCRIPTION OF THE INVENTION

Figure 1:
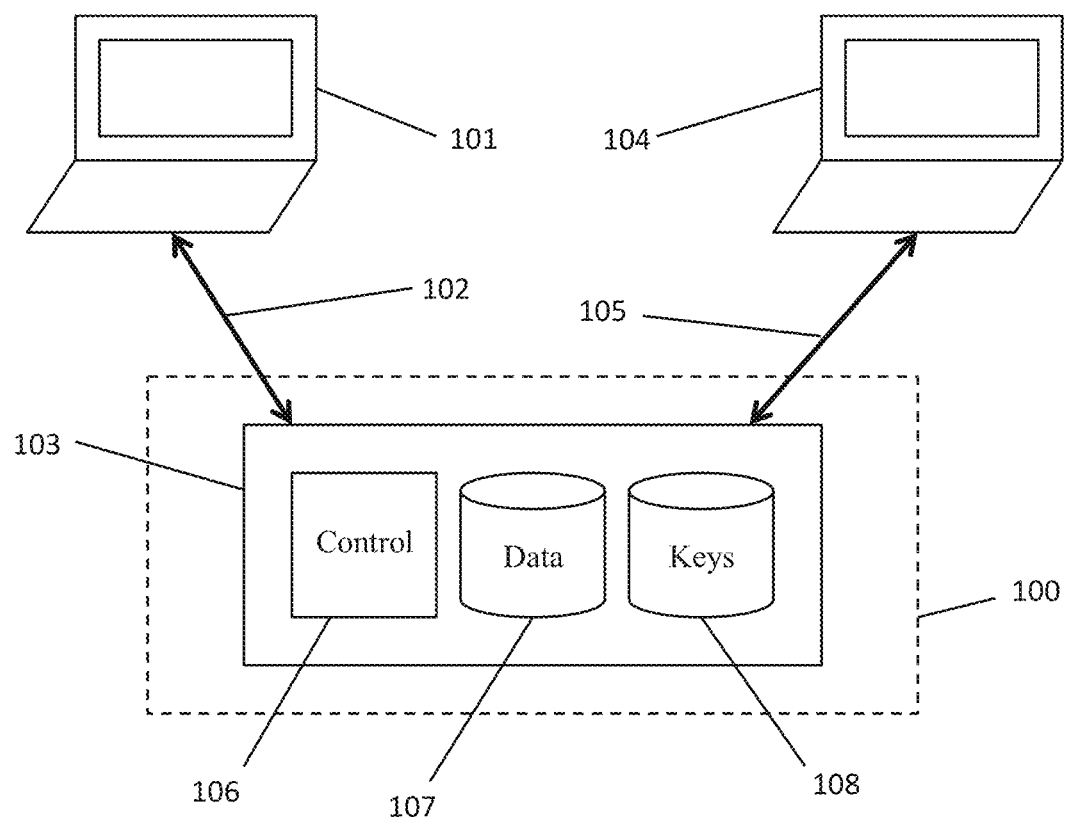
FIG. 1 is a representation of the invention in use on a Network.

FIG. 1 represents a configuration of the invention as it relates to use in a Network 100, such as the Internet or an Intranet, but is not limited to these means and could also use other electronic, electromagnetic or other methods to form any sort of Network. The User interfaces with a computer, tablet, smartphone or some other electronic Device 101 that has some sort of Connection 102 to Network 100. Said Connection 102 includes any and all means with which a User might connect to the main components of the System Of The Invention (SOTI) 103 that is connected to the Network 100. Other Users can connect to Network 100 and hence SOTI 103 using either the same Device 101 and Connection 102 or a separate and distinct Device 104 and Connection 105.

Still referring to FIG. 1, to aid in understanding the invention and its unique benefits, it is helpful to consider SOTI 103 being generally comprised of three major components, which are Control 106, a repository of the encrypted Data 107 and a repository of the encryption Keys 108, whereby Control 106 is the means by which a User interacts with SOTI 103 to manage Data 107 and Keys 108. In terms of actual physical and electronic implementation, the invention is not limited to this configuration as these three components can be combined or further divided in a near limitless number of arrangements.

Still referring to FIG. 1, the configuration of Control 106, Data 107 and Keys 108 relates to the nature and implementation of commonly known and used encryption methodologies. In general, encryption is a means of using a unique key to encrypt (scramble) some information, making the information unreadable and unusable to anyone who accesses the information while it's in an encrypted state. The data must be decrypted before it can become readable and usable. For every discrete file of data to be encrypted, henceforth referred to as an "Item", there is a single, unique key that can exclusively decrypt the file, to be referred to as the Item Encryption Key (IEK), which itself is encrypted by the MK, either directly or through additional encryption keys, and stored in an encrypted state on Keys 108. The User of the Item generally keeps the MK secret and securely out of reach from everyone and anyone, thusly ensuring that the Item can never be read by anyone other than himself.

In terms of configuration, the IEK used to encrypt an Item may be unique to the Item, or alternately there may be a single IEK used for multiple Items. For the purposes of simplification, the configuration that will be used to describe the invention will be that each Item will have a distinct IEK. However, there may be multiple copies of each IEK given to each person who has access to that same corresponding Item. The invention is not limited to this configuration and the use of a single IEK for more than one Item is also a possible configuration.

In the current state of encryption technology, there are two commonly known and used encryption methodologies, both of which are applicable to the invention. First, Symmetric Encryption, such as but not limited to AES/Rijndael, uses a single encryption key to both encrypt and decrypt the Item. Only the key that was used to encrypt the Item can be used to decrypt it. Second, Asymmetric Encryption, such as but not limited to RSA, uses a unique pair of matched keys, one generally for encryption and the other for decryption. For asymmetric encryption, once the encrypting key encrypts the Item, even the encryption key itself cannot be used to decrypt it. Instead, only the matched decryption key can decrypt the Item. Generally, a decryption key can only decrypt Items for the key with which it is paired. In the case of symmetric encryption, the symmetric encryption key is the IEK. In terms of asymmetric encryption, the decryption key is the Private Encryption Key (prEK), which is also the IEK, while the key used for encryption is the Public Encryption Key (puEK), which is not the IEK.

Again referring to FIG. 1 and the relationship between Control 106, Data 107 and Keys 108, Control 106 is all the means by which the User of the invention creates, transforms, organizes, accesses, shares and Recovers, and hence manages, the data in Data 107, inclusive of using the keys in Keys 108 to do so. Control 106 processes all data requests by the User and is the gatekeeper to the data stored on Data 107 by being the keeper of the keys stored on Keys 108. Data 107 cannot be accessed without Keys 108, which is controlled by Control 106. Hence a primary objective of Control 106 is to manage Keys 108, because as previously stated, the encrypted Items in Data 107 are not usable to anyone without the keys in Keys 108.

Figure 2:
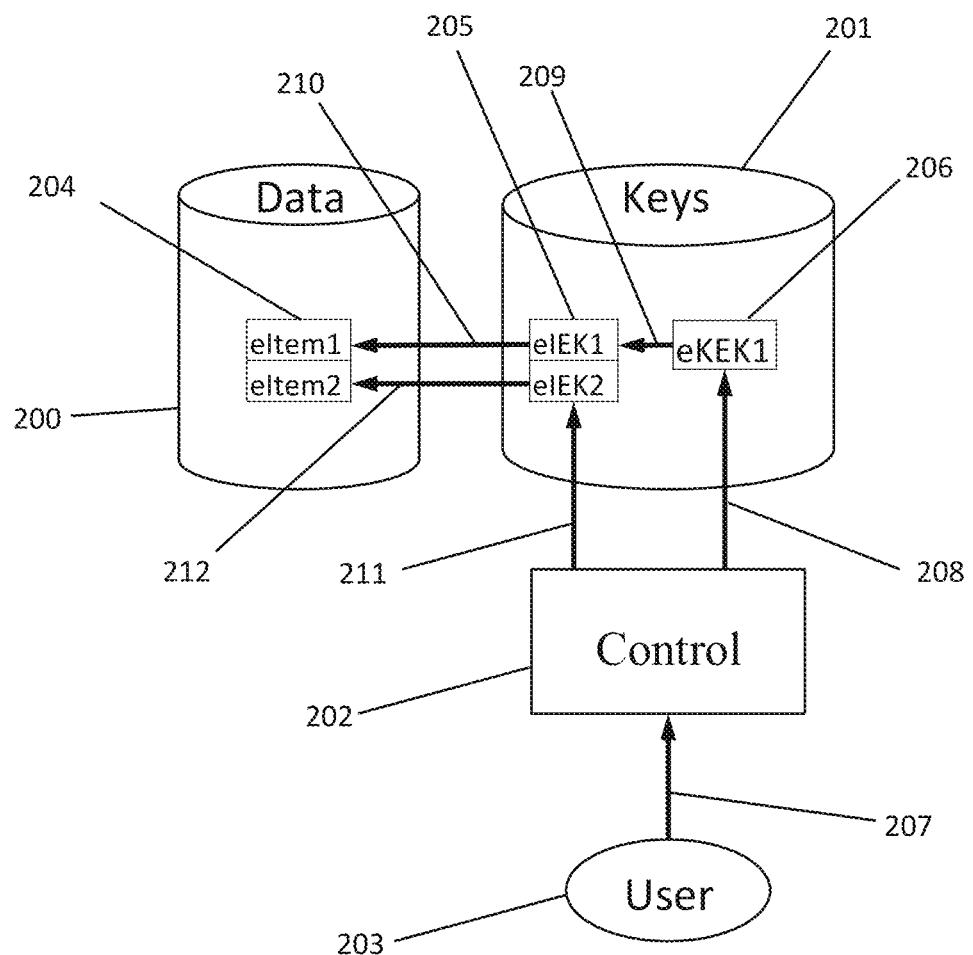
FIG. 2 is a representation of interactions of some components of the invention.

FIG. 2 shows a simple data example that illustrates the use of encryption as it relates to the interaction of SOTI components Data 200, Keys 201, Control 202, and the User 203. Data 200 is shown with Item Table 204, which contains Encrypted Item1 (eItem1) and Encrypted Item2 (eItem2), which are the encrypted versions of Item1 and Item2, respectively. Item Encryption Key Table (IEK Table) 205 contains Encrypted Item Encryption Key1 (eIEK1) and Encrypted Item Encryption Key2 (eIEK2), whereby eIEK1 and eIEK2 are the encrypted versions of Item Encryption Key1 (IEK1) and Item Encryption Key2 (IEK2), respectively. IEK1 and IEK2 are the keys needed to decrypt eItem1 and eItem2, respectively, to generate Item1 and Item2, respectively.

Still referring to FIG. 2, Key Encryption Key Table (KEK Table) 206 contains Encrypted Key Encryption Key1 (eKEK1), which is the encrypted version of Key Encryption Key1 (KEK1), whereby KEK1 is needed to decrypt eIEK1 stored in IEK Table 205. eIEK2 in IEK Table 205 and eKEK1 in KEK Table 206 can only be decrypted with the Master Key (MK) which only exists outside the system in the possession of User 203, and must be manually entered into the system by the User 203.

Still referring to FIG. 2, the process flow example of the decryption and retrieval of Items illustrates the working mechanisms of this configuration. User 203 manually enters her MK into SOTI along with identifying the Items she wants, as depicted by Process Flow 207. Control 202 processes the entry to ensure the MK is valid along with identifying the elements in Data 200 and Keys 201 that pertain to the User's request. In this example, the User requests both Item1 and Item2. Control 202 uses the MK entered by User 203 to decrypt eKEK1 in KEK Table 206, as represented by Process Flow 208, resulting in KEK1. KEK1 is then used by Control 202 to decrypt eIEK1 in IEK Table 205, as depicted by Process Flow 209, to generate IEK1. IEK1 is then used by Control 202 to decrypt eItem1 in Item Table 204, as represented by Process Flow 210, to generate the unencrypted Item1. Control 202 then passes Item1 to User 203 and upon doing so all the decrypted versions of the keys that were generated to produce Item1 are erased and not stored anywhere in SOTI.

Still referring to FIG. 2, for the User's request of Item2, Control 202 uses the MK entered by User 203, shown by Process Flow 207, to decrypt eIEK2 in IEK Table 205, as represented by Process Flow 211, resulting in the IEK2. IEK2 is then used by Control 202 to decrypt eItem2 in Item Table 204, shown by Process Flow 212, to generate the unencrypted Item2. Control 202 then passes Item2 to User 203 and upon doing so all the decrypted versions of the keys that were generated to produce Item2 are erased and not stored anywhere in SOTI.

Still referring to FIG. 2, the important distinction between the processes of accessing Item1 and Item2 pertain to the additional step to unlock KEK1 in KEK Table 206 in accessing Item1. This highlights that eIEKs can be decrypted directly by the MK or indirectly with the MK decrypting the eKEK which then decrypts the eIEK. Regardless, without the MK, nothing in Keys 201 can be decrypted.

Still referring to FIG. 2, one of the unique features of this configuration of the invention is the nature of the data stored on the Data 200 and Keys 201. While it isn't necessary for the invention to work this way, there are benefits in the configuration of these components with one or more of the following nine attributes: (1) only Items are stored in Data 200; (2) all Items stored in Data 200 are encrypted; (3) for every encrypted Item stored on Data 200 there is a single, unique key that can decrypt the Item, known as the Item Encryption Key (IEK), although there may be multiple copies of it; (4) all copies of all IEKs are stored in Keys 201 (In the case of asymmetric encryption where there are is a matched set of keys, the encrypting key—the public key— need not be encrypted. However, this does not apply to the decryption key—the private key—which is encrypted and stored on Keys 201.); (5) only encryption keys, both IEKs and KEKs, are stored in Keys 201, whereby IEKs are used on Items, and KEKs are used on IEKs or other KEKs; (6) all keys stored in Keys 201 are encrypted, except in the case if public encryption keys are stored in Keys 201, as public encryption keys are not encrypted; (7) all IEKs stored in Keys 201 can only be decrypted by MKs or RKs, either directly or indirectly through additional keys; (8) all MKs are stored outside SOTI in the possession of Users, and must be manually entered into SOTI by the Users; (9) all RKs are stored electronically either in SOTI or somewhere on the Network in an encrypted state, but in general are stored as Items in the Data 200 but can also be stored in Keys 201.

Still referring to FIG. 2, one overarching benefit of this arrangement is that without the MK, any person or party in possession of any or all of the encrypted Items in Data 200, and/or any of the encrypted keys in Keys 201, cannot decrypt anything and hence cannot read any of the information. Thus, all the information stored in Data 200 and Keys 201 is unusable by anyone other than the holder of the MK, including SOTI itself, Administrators of SOTI, third parties to SOTI, or unauthorized persons or parties who gain access to Data 200, Keys 201 or even Control 202. This has multiple associated benefits, including but not limited to, increasing flexibility in where Data 200 and Keys 201, in whole or in part, can be stored, such as on the devices being used by the Users, with third party Service Providers on the Network, or possibly in the public domain itself. In some of these configurations, it may be necessary to implement additional safeguards to guard against unauthorized deletion or alteration of Items or Keys. Likewise, some aspects of Control 202 may also be distributed to various parties, devices, Users and third party Service Providers on the Network.

Referring back to FIG. 2, another benefit of this configuration is that associating every encrypted Item on Data 200 with a unique IEK on Keys 201, allows the User to grant access of an individual Item to a multitude of other Users without granting access to any other Item owned by the User. The User simply shares a copy of the applicable IEK, and only that IEK, with the Users being granted access to the particular Item. The User does not share his MK, and subsequently does not grant unfettered access to his other IEKs, and hence the Items associated with these IEKs. If a User wishes to revoke access to a particular Item, Control 202 re-encrypts the Item with a newly randomly generated IEK, created by SOTI, and shares the new IEK with the new list of shared Users, which does not include the User whose access has been revoked. Thus, the User has complete flexibility in which Items are shared with which Users.

Figure 3:
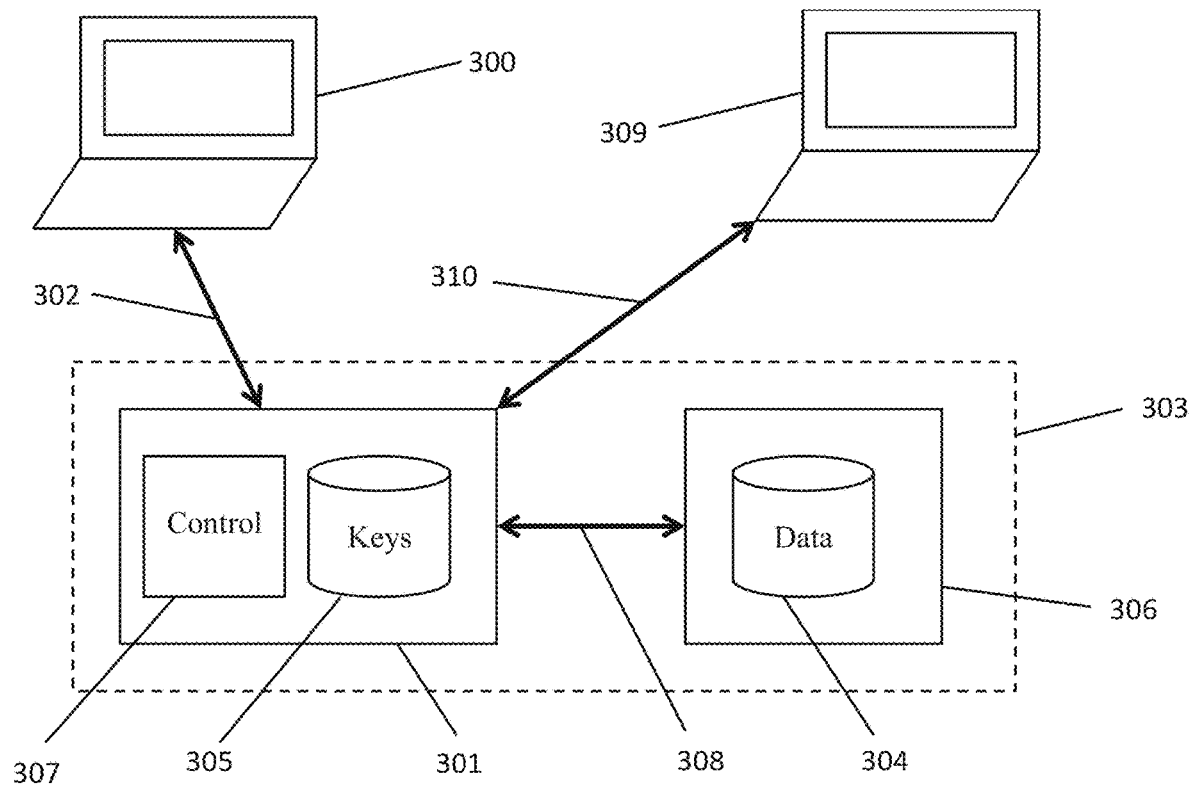
FIG. 3 is an alternate representation of the invention in use on a Network.

Based on the separation of the IEKs from the Items, FIG. 3 shows an alternate configuration of the invention where the flexibility in locating components or parts of components increases the applicability of SOTI. In this configuration, the User uses Device 300 to access SOTI 301 through Connection 302 on Network 303. SOTI 301 no longer contains Data 304, but still contains Keys 305. Instead, Data 304 is part of a separate System 306 to which Control 307 accesses through Connection 308. To the User using SOTI 301 through Device 300, or another User using SOTI 301 through Device 309 with Connection 310 to Network 303, there may not appear any difference in the functionality of this configuration compared to as if Data 304 were an internal component of SOTI 301 instead of being a component of System 306.

Still referring to FIG. 3, the separation of Items being encrypted from the eIEKs has the benefit of being able to use the Recovery process of SOTI on Items that are created, housed or used in third party systems. Examples of which include, but are not limited to, third party cloud-based document storage providers, third party email services and any form of third party communication service. The documents, images, videos, texts, or any other types of Items, can be created or stored in the third party system while the Users of the Items can encrypt and decrypt the Items by interfacing, either fully or partially, with Control 307. In such a configuration, for example, the third party cloud-based document storage provider could be represented by System 306, whereby a User using Device 300 accesses SOTI 301 to encrypt and decrypt Items on Data 304, as well as upload encrypted Items to Data 304, and possibly carry out other functionality on System 306 as well.

Figure 4:
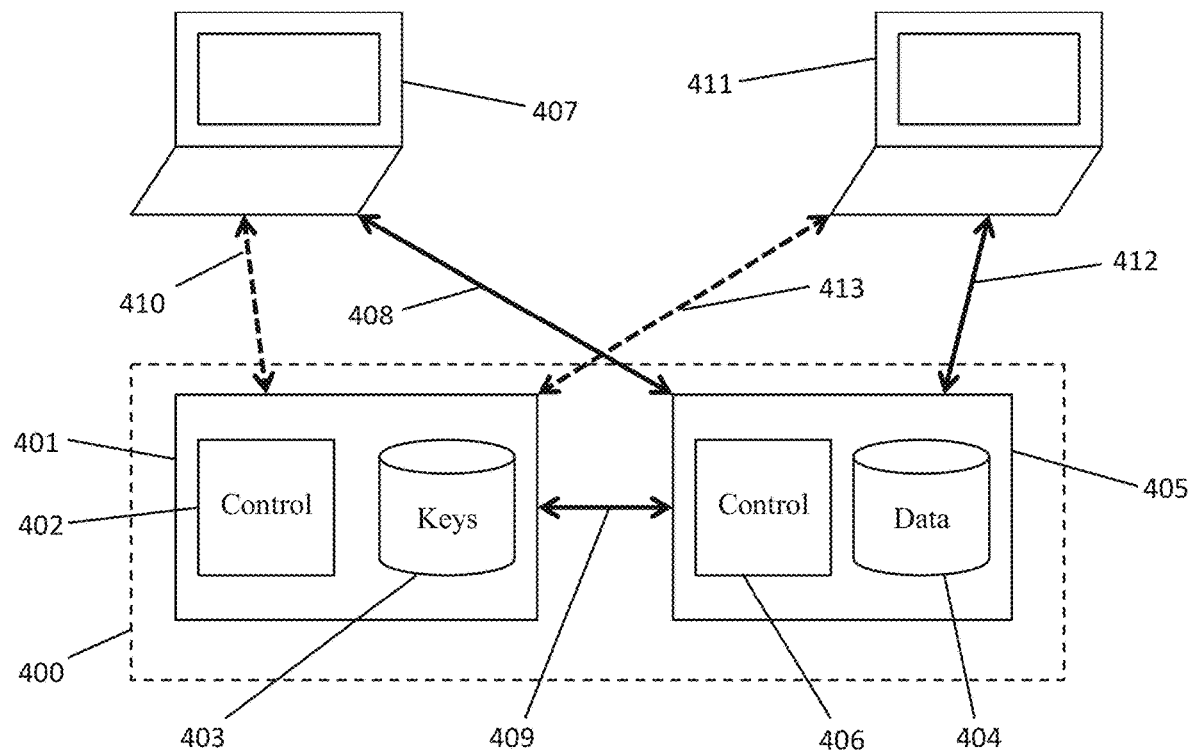
FIG. 4 is another alternate representation of the invention in use on a Network.

FIG. 4 further expands on the concept of the separation of the data being encrypted from the rest of SOTI by also allocating a portion of the Control component of SOTI to the secondary system, such as a third party cloud-based document storage provider. This configuration also pertains to a Network 400 configuration. In this configuration, SOTI 401 maintains the main portions of Control 402 and all of Keys 403, but in addition to all or some of the encrypted Items being stored in Data 404 in another System 405, some minor functionality of the control aspects of the invention are housed in Control 406 in System 405 to enable a User using Device 407 to fully or partially interface with System 405 through Connection 408 regarding aspects of encryption. Control 406 processes the request but is generally unable to either encrypt or decrypt any Items housed on Data 404. Instead, System 405 uses Control 406 to interact with SOTI 401 and in particular Control 402, by requesting either encryption or decryption of a particular Item, as shown by Connection 409. Control 402 validates the request and then accesses the appropriate keys in Keys 403 that pertain to the request. SOTI 401 then executes the encryption or decryption, or any request pertaining to changes in the keys housed in Keys 403. The result, or confirmation of the result, is then passed back to System 405 to pass either the decrypted information or other information to the User using Device 407 through Connection 408. To the User of Device 407, all functionality between SOTI 401 and System 405 is, or can be, transparent. Alternatively, the User, using Device 407 may also interface with SOTI 401 through direct Connection 410. Similarly, another User using another Device 411 could completely interface with System 405 for all functionality through Connection 412 but may also have direct access to SOTI 401 through Connection 413 with overlapping or additional functionality. As mentioned, a practical example of this functionality could be an arrangement with a third party document storage provider whereby the User would completely or mostly interact directly with the document storage provider's System 405 for all data requests, deposits, and changes to all related functionality, and would not generally need to interface directly with SOTI for individual Item requests, assuming the User has previously set up his MK directly through SOTI.

Figure 5:
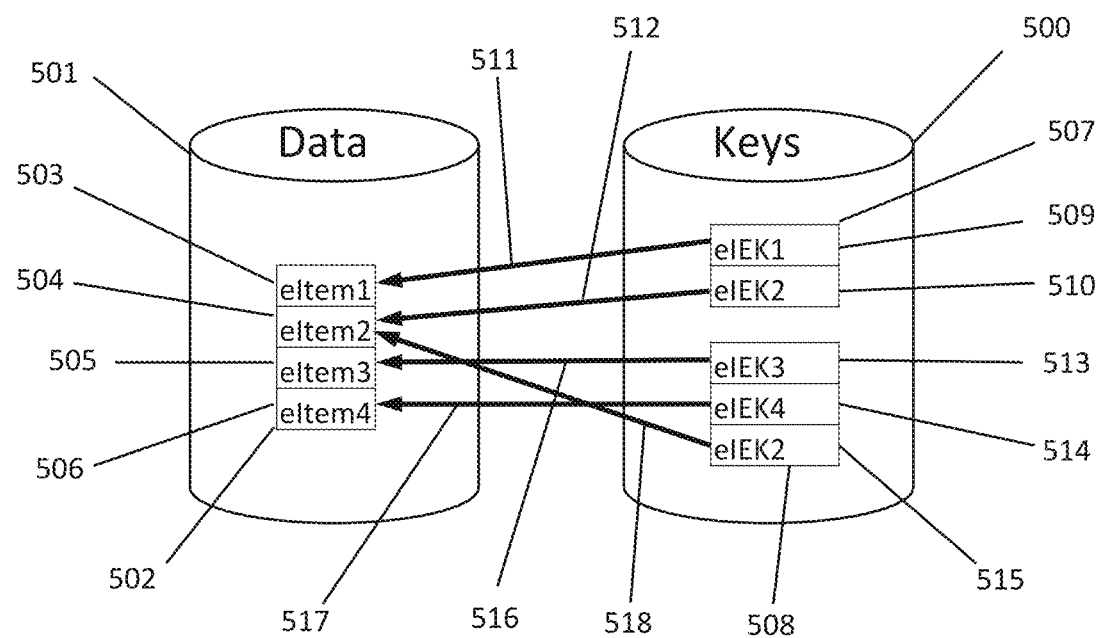
FIG. 5 is another representation of interactions of some components of the invention.

FIG. 5 illustrates a unique arrangement with IEKs in Keys 500 and Items in Data 501 as it pertains to sharing access to Items with other Users. In this example there are four Items stored in Item Table (IT) 502: Encrypted Item1 (eItem1) 503, Encrypted Item2 (eItem2) 504, Encrypted Item3 (eItem3) 505 and Encrypted Item4 (eItem4) 506. In this example, although it is not a requirement of the invention, the Items in IT 502 are not specific to any single User, but rather represent all Items stored by all Users. A unique aspect and benefit of this configuration is that each Item is stored only once in IT 502, regardless of how many times individual Users share their Items with each other, although this is not a requirement of the invention.

Still referring to FIG. 5, there are two Key Cabinets (KCs), Key Cabinet1 (KC1) 507 and Key Cabient2 (KC2) 508, stored in Keys 500. A property of this configuration is that each of the two KCs, KC1 507 and KC2 508, is specific to a unique User. KC1 507 pertains to User1 (User1 is not shown in FIG. 5), and KC2 508 pertains to User2 (User2 is not shown in FIG. 5). In KC1 507 there are two Encrypted Item Encryption Keys (eIEKs), Encrypted Item Encryption Key1 (eIEK1) 509 and Encrypted Item Encryption Key2 (eIEK2) 510. eIEK1 509 is the encrypted version of the decryption key, IEK1, for eItem1 503 as shown by Connection 511. Similarly, eIEK2 510 is an encrypted version of the decryption key, IEK2, for eItem2 504 as shown by Connection 512. In this example, User1 is the rightful owner of eItem1 503 and eItem2 504. User2 is the rightful owner of KC2 508, which includes three keys, Encrypted Item Encryption Key3 (eIEK3) 513, Encrypted Item Encryption Key4 (eIEK4) 514, and Encrypted Item Encryption Key2 (eIEK2) 515. eIEK3 513 is the encrypted version of the decryption key for eItem3 505, as shown by Connection 516, eIEK4 514 is the encrypted version of the decryption key for eItem4 506, as shown by Connection 517, and eIEK2 515 is the encrypted version of the decryption key for eItem2 504, as show by connection 518. Note that eItem2 504 has two decryption keys connected to it, eIEK2 510 and eIEK2 515, as shown by Connections 512 and 518 respectively. While User2 is the rightful owner of eItem3 505 and eItem4 506, and hence eIEK3 513 and eIEK4 514, respectively, he is not the rightful owner of eItem2 504 despite having a key eIEK2 515 in his KC2 508 that pertains to eItem2 504. In this example, User1 has granted access of eItem2 504 to User2 and by so doing has enabled SOTI to deposit a copy of IEK2 for Item2 in User2's KC 508, resulting in eIEK2 515. While eIEK2 510 with User1 and eIEK2 515 with User2 are based on the same item encryption key, IEK2, the encrypted versions of IEK2 are different for each User in that User1's MK is used for encryption of eIEK2 510 while User2's MK, which is different than that of User1, is used for encryption of eIEK2 515. Thus, eIEK2 510 and eIEK2 515 are different and only the User who owns the KC in which each key is deposited can decrypt it. This copying and sharing of individual IEKs has multiple benefits, including but not limited to, that it enables the owner of an Item to share access with any number of other users of the invention, without limitation and that it allows for easy changes to sharing permissions to Items.

Still referring to FIG. 5, to highlight this benefit of the invention, when User1 directs SOTI to revoke User2's access to eItem2 504, the Control portion of SOTI re-encrypts Item2 with a new, different IEK, randomly generated by SOTI, and then shares copies of this IEK with the Users that User1 wishes to continue granting access, which no longer includes User2. At this point, the prior IEK2 515 for User2 is no longer usable in decrypting eItem2 504. If User1 wishes to give another User access to eItem2, or any other of his encrypted Items, SOTI simply shares a copy of the particular IEK for the Item with the new User's KC, which is then encrypted using the new User's MK and subsequently stored in his KC.

As previously mentioned, one of the benefits of the configuration in FIG. 5 is minimizing storage space while allowing for unlimited sharing capability. Typically, Items are larger than the decryption keys and storing Items only once minimizes the storage space required for Items. Conversely, since decryption keys aren't that large, creating an additional copy with every User to which an Item is shared doesn't increase space nearly as much as duplicating the Items. However, it is not necessary for the functioning of the invention that each Item only be stored once, while the number of copies of keys is equal to the number of Users who have access to the particular Item. The Items can also be copied and stored for each User. In particular, there are instances where the Items themselves are as small as the decryption keys, such as when the Item is a Password. In such a case, there is no effective reduction in space usage by using the configuration in FIG. 5 and either using the configuration in FIG. 5 or duplicating the Items are equally effective means of use.

In further understanding the configuration of FIG. 5, it is helpful to elaborate on the deployment of symmetric and asymmetric encryption. Symmetric encryption is generally used when the same User, or entity, that encrypts the Item is also the User, or entity, who decrypts it. On the other hand, asymmetric encryption is generally used when an Item is being secretly shared with another User, where the first User is the originator of the Item and wishes to share it with the second User and only the second User, over a Network with other Users. Since neither the second nor first User wishes to share all their personal encrypted Items with the other, or with any other User on the Network, symmetric encryption would not work. With asymmetric encryption, however, there is no concern in revealing any encrypted Items by sharing only the puEK since it can only be used to encrypt and not decrypt. Thus, the first User would encrypt the Item using the second User's puEK. The second User would maintain sole access to the matching prEK and would be the only person who could decrypt the Item. With this arrangement, multiple persons can share data with other Users without ever having any access to any other of the recipient User's encrypted Items.

In terms of FIG. 5, if symmetric encryption is used, the IEK becomes a symmetric key. For example, eIEK1 509 would be an encrypted state of IEK1, which would be a symmetric encryption key used for both encryption and decryption for Item1, the Item to which it is matched. Conversely, if asymmetric encryption were used then the prEK becomes the IEK1 and when encrypted by the User1's MK it would become eIEK1 509. In this case, the puEK that is used to encrypt the Item could be stored somewhere else, in an unencrypted state, accessible to all Users and Administrators of SOTI.

Still referring to FIG. 5, in the case of symmetric encryption, the User would enter her MK, which is used by SOTI to decrypt eIEK1 509, to generate IEK1, which would then be used to decrypt eItem1 503, to generate Item1. To encrypt or re-encrypt the Item1, the User's MK would be used to decrypt the eIEK1 509 to generate the IEK1, which would then be used to encrypt Item1, generating eItem1, which is then deposited in the IT 502 as the new eItem1 503, replacing the previous eItem1 503. Alternately, SOTI could generate a new symmetric IEK every time an Item is re-encrypted and deposit the new IEK with all appropriate User accounts.

Still referring to FIG. 5, in the case of using asymmetric encryption to decrypt an Item, the User enters his MK, which would be used to decrypt eIEK1 509 to generate the IEK1, which happens to be the prEK for the Item. The prEK would then be used to decrypt eItem1 503 to generate Item1.

Still referring to FIG. 5, in the case of using asymmetric encryption to encrypt an Item, the key that is used to encrypt the Item is the puEK for the Item, which exists in an unencrypted state with the location known by SOTI (not shown in FIG. 5). The User need not enter her MK to decrypt the puEK, because it is not encrypted as it is stored by SOTI. Once the User identifies the Item to be encrypted, SOTI identifies and uses the applicable puEK to encrypt the Item. Once the Item is encrypted, only the Users who have been given a copy of the associated prEK, which is the IEK, would be able to decrypt the eItem. For this configuration, using either symmetric or asymmetric encryption, updating Items in Data 501 does not necessitate the need to update the keys in Keys 500.

An alternate configuration to that shown on FIG. 5 is to use asymmetric encryption for the KEKs and symmetric encryption for the IEKs. This configuration facilitates a simplistic process of sharing Items with other Users by, after creating a new IEK with which to encrypt either a new Item or to re-encrypt an existing Item, depositing the new IEK in the KC's of each User with whom the Item is shared, using the respective User's PuEK to produce the eIEK for each User. In this case, no KCs need to be first unlocked to encrypt and deposit either the Item or the IEKs. This configuration is further detailed in FIG. 6.

Figure 6:
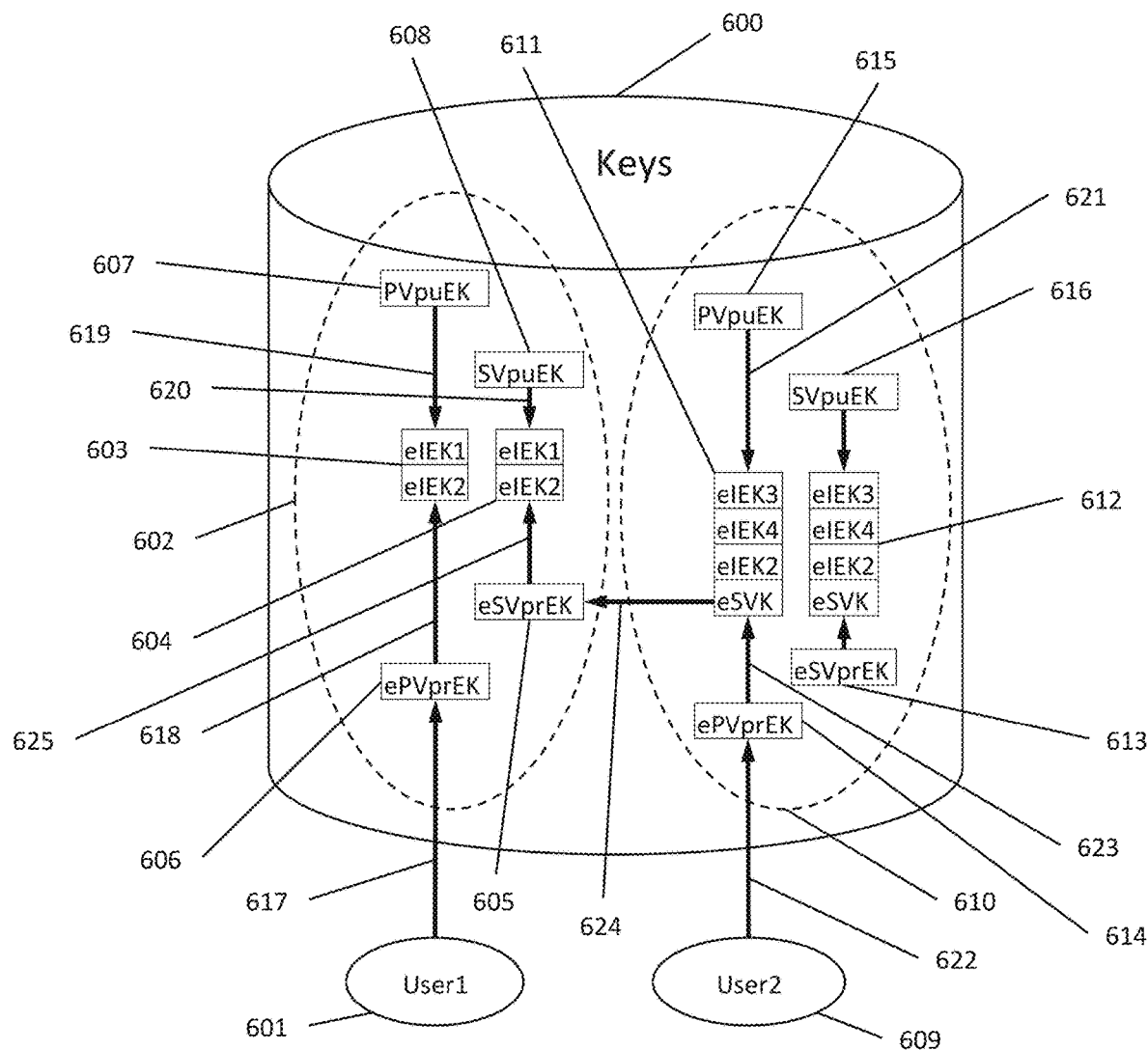
FIG. 6 is a further representation of interactions of some components of the invention.

FIG. 6 illustrates the process of Recovery between Users on Keys 600 whereby Recovery refers to the process of a User regaining access to information that had become inaccessible due to losing his MK. User1 601 has a Profile 602 on Keys 600 consisting of six components: Primary Vault (PV) 603, Shadow Vault (SV) 604, Encrypted Shadow Vault Private Encryption Key (eSVprEK) 605, Encrypted Primary Vault Private Encryption Key (ePVprEK) 606, Primary Vault Public Encryption Key (PVpuEK) 607 and Shadow Vault Public Encryption Key (SVpuEK) 608. Each User on SOTI has the same six components in their profile on Keys 600, which in this example is only showing two Users, User1 601 and User2 609. Likewise, User2 609 has Profile 610 consisting of PV 611, SV 612, eSVprEK 613, ePVprEK 614, PVpuEK 615 and SVpuEK 616. In this example, asymmetric encryption is used to access both PVs and SVs. For User1 601, the asymmetric keys associated with PV 603 are the matched pair ePVprEK 606 and PVpuEK 607. For User1's SV 604, the asymmetric keys are matched pair eSVprEK 605 and SVpuEK 608. Everything under every User's Profile is encrypted, except for the public encryption keys for both PVs and SVs, which in this example are PVpuEK 607 and SVpuEK 608 for User1's Profile 602, and PVpuEK 615 and SVpuEK 616 for User2's Profile 610. These public encryption keys are used to encrypt and make deposits into PV 603, SV 604, PV 611 and SV 612, respectively. Only their associated matched private keys can decrypt the contents of PV 603, SV 604, PV 611 and SV 612, respectively.

Still referring to FIG. 6, User1 601 enters his MK, which SOTI then uses to decrypt ePVprEK 606 to generate the PVprEK, represented by Process Flow 617, whereby PVprEK represents the KEK for all IEKs in PV 603. Once the ePVprEK 606 has been decrypted, the generated PVprEK is then used by SOTI to access and decrypt the contents of PV 603, as represented by Process Flow 618. In this example there are two encrypted IEKs in PV 603, eIEK1 and eIEK2. Since these are keys and not Items, User1 would only use these keys to access the Items to which they are associated, Item1 and Item 2, respectively, which are not shown on FIG. 6. In this example, the encrypted IEKs in PV 603 and PV 611 are symmetric encryption keys and are used to both encrypt and decrypt the associated Items to which they have been assigned, but asymmetric encryption could also be used.

Still referring to FIG. 6, if User1 601 were to update Item1, he would first need to access it. Upon entering his MK, SOTI would use it to decrypt ePVprEK 606 to generate the PVprEK, as shown by Process Flow 617, which would then be used to decrypt eIEK1 in PV 603, to generate IEK1, as shown by Process Flow 618. IEK1 would then be used by SOTI to access and decrypt eItem1 wherever it resides (eItem1 is not shown on FIG. 6), and grant access to the unencrypted Item to User1 for review and editing. At the completion of this process, except for a temporary Browser session proxy for the EK, none of the decrypted keys would be saved by SOTI and SOTI will once again need to decrypt the keys to facilitate the re-deposit of the Item, again assuming the IEKs are symmetric encryption keys. That process begins when SOTI again uses the MK to decrypt ePVprEK 606, shown by Process Flow 617. The PVprEK would then be used to decrypt eIEK1 in PV 603 as shown by Process Flow 618. IEK1 would be used to re-encrypt the newly updated Item1 and deposit it wherever it is stored (not shown in FIG. 6). At the completion of this step, none of the unencrypted keys would be stored by SOTI. At this point, User1's Item Table has been updated, but no changes have been made to User1's PV 603, and thus no changes are made to User1's SV 604.

Still referring to FIG. 6, if the IEKs were asymmetric encryption keys, they would be the prIEKs, and the process for re-depositing an Item is less complex. Because the puIEK would not be encrypted or stored in PV 603, there are no keys to be decrypted to make the deposit. SOTI would simply use the unencrypted puIEK to re-encrypt the Item and then deposit it wherever it resides (not shown in FIG. 6).

Still referring to FIG. 6, an alternate method of updating the Item would be that once the update is complete, SOTI would create a new IEK for the Item and then deposit copies of it into all the KCs of all the Users who have access to the Item, using each User's public encryption key to encrypt each copy of the IEK before depositing it. Using Item2 as an example, after User1 finished updating Item2, SOTI would create a new IEK2 for Item2, whereby IEK2 would generally be a symmetric encryption key, but asymmetric encryption could also be used, then encrypt Item2 with the new IEK2. After which, SOTI would deposit copies of IEK2 in User1's PV 603 and SV 604, as well as User2's PV 611 and SV 612 after having encrypted each copy with PVpuEK 607 and PVpuEK 615, respectively.

Still referring to FIG. 6, regardless if the IEKs are symmetric or asymmetric encryption keys, the process of adding new Items is similar. For example, if User1 601 were to add Item3 (which is not shown in FIG. 6), upon initiating the action, SOTI would randomly generate a new IEK3 for new Item3 and use it to encrypt Item3. In the case of symmetric encryption the single key would be IEK3 and it would be used to encrypt Item3 before itself being encrypted by PVpuEK 607 and deposited in PV 603. If asymmetric encryption were used to generate the IEKs, the puIEK would be used to encrypt Item3 and the prIEK would be encrypted by PVpuEK 607 and deposited in PV 603. Either way, because User1's PV 603 had been updated, his SV would also need to reflect the update.

Still referring to FIG. 6, in terms of updating User1's SV 604 after his PV 603 has been updated, one method of achieving this is for SOTI to decrypt User1's entire PV 603 using the PVprEK generated from ePVprEK 606, then re-encrypt each IEK in PV 603 using SVpuEK 608, and over-write the contents of SV 604 with the newly encrypted IEKs. Thus, at the completion of the entire process, User1's PV 603 and SV 604 would be updated and current, and would both include uniquely encrypted versions of IEK3. An alternate method of updating SV 604 would be, after encrypting and depositing the new eItem3, SOTI would then encrypt two copies of IEK3 simultaneously using PVpuEK 607 and SVpuEK 608, and deposit the two results in PV 603 and SV 604 respectively.

Still referring to FIG. 6, while there are two eIEKs in User1's PV 603, which are eIEK1 and eIEK2, User2 609 has four encrypted keys in her PV 611, which are eIEK3, eIEK4, eIEK2 and Encrypted Shadow Vault Key (eSVK). While each User would have an eIEK in their PV for each of the Items they owns, they may also have additional keys in their PV that pertain to Items that they does not own but have been shared with them by another User. In this example, User2 609 has been given one shared eIEK in her PV 611, which is eIEK2. IEK2 is owned by User1 601 and as such is in User1's PV 603 in the encrypted state eIEK2. User1 601 has shared Item2 with User2 609 and by doing so SOTI has deposited IEK2 for Item2 in User2's PV 611, where it has been encrypted with User2's PVpuEK 615, as shown by Process Flow 621, resulting in the encrypted version, eIEK2. It is important to note that eIEK2 in User1's PV 603 is different from eIEK2 in User2's PV 611. While both encrypted keys are based off the same unencrypted key, IEK2, both have been encrypted using different keys, User1's PVpuEK 607 and User2's PVpuEK 615, respectively.

Still referring to FIG. 6, as previously noted, Shadow Vault (SV) 604 contains the exact same content as the PV 603, which would be, if in an unencrypted state, IEK1 and IEK2. Hence, SV 604 "shadows" PV 603. Whenever PV 603 is updated, SV 604 is also immediately updated. However, as previously stated, there is one important difference between PV 603 and SV 604—they are encrypted/decrypted with different encryption keys. The key that decrypts PV 603 will not work to decrypt SV 604, and correspondingly the key that encrypts PV 603 is not the same that encrypts SV 604. In this example, asymmetric encryption is being used so there is a pair of encryption keys for PV 603 and a separate pair for SV 604. All SVs for all Users in SOTI, in this example, have this same property of having different encryption key pairs than the PVs they shadow. In terms of User2 609, the associated SV for PV 611 is SV 612.

Still referring to FIG. 6, an important aspect of the invention is that while both PV 603 and SV 604 contain the same content in an unencrypted state, they employ unique encryption keys, making access to each only possible with their respective individual keys. This allows for making a separate method of accessing the SV 604 to facilitate the Recovery process, while not interfering with or compromising the normal process by which User1 601 accesses his PV 603. User1's MK cannot be used to access his SV 604, but more importantly, User1's Shadow Vault Key (SVK)—which is used to decrypt User1's eSVprEK to generate the SVprEK, which in turn decrypts User1's SV 604—cannot be used to access or decrypt User1's PV 603. If anyone were to gain access to User1's unencrypted SVK, including User1's Friends in his VCNOF, they cannot access User1's Profile 602 through any SOTI User interface as all SOTI User interfaces only connect to PVs.

Still referring to FIG. 6, the SVK that pertains to User1's SV 604 has a parallel relationship with User1's MK in that each is the primary key needed to access SV 604 and PV 603, respectively. Both are also symmetric encryption keys and neither is stored in User1's Profile 602. However, there are some important differences between the MK and the SVK. First, User1 creates the MK while SOTI randomly generates the SVK. Second, User1 knows what the MK is and maintains control of it personally, while User1 does not know what the SVK is and does not maintain control of it. The MK is maintained outside of SOTI and physically outside the Network. The SVK is stored inside SOTI in Keys 600, but not under User1's Profile 602. Rather, User1's SVK is stored under the Friends' Profiles that User1 has selected to help him in Recovery. The Profiles of each of these Friends, which in this case is only User2's Profile 610, receives a copy of User1's SVK which is then encrypted and deposited into that particular Friend's PV, and backed up to each Friend's SV. In this case, eSVK in User2's PV 611 is the encrypted SVK that pertains to User1's SV 604, and User2's PV 611 is backed up to SV 612. Nowhere on SOTI, or anywhere on the Network, is an unencrypted version of any User's SVK stored, nor does SOTI, or any Administrators of SOTI, have any means available to decrypt any SVK for any User without the assistance of the User's Friend, which requires the Friend to manually enter their MK before SOTI can decrypt the SVK to enable it to be used for Recovery. Users are necessary to access any and all Items and Keys, and to facilitate all Recovery. This creates a level of privacy of User information while simultaneously reducing the risk of inability to access data due to losing the MK.

Still referring to FIG. 6, while in this example each User's PV consists primarily of Item Encryption Keys, this need not be a requirement of the invention. Items themselves can also be stored in each User's PV, as well as can be a combination of Items and Keys.

Still referring to FIG. 6, the Recovery process would begin when User 601 realizes he has lost his MK and can no longer access her PV 603 and hence his encrypted Items (not shown in FIG. 6). When this occurs, SOTI forces User 601 to create a new MK and in the process SOTI creates a new Profile for User1, which includes new versions of the six components in a Profile, namely the PV, SV, PVprEK, PVpuEK, SVprEK and SVpuEK. In creating a new Profile for User1, SOTI does not alter or erase the old Profile 602. Alternately, SOTI could keep SV 604 and eSVprEK 605 from the old Profile intact but erase PV 603, ePVprEK 606, PVpuEK 607 and SVprEK 608. The important consideration is the SV 604 and eSVprEK 605 from the old Profile remain intact. SOTI also shares the new SVK with User'1s Friends' Profiles by depositing it in each Friends' PV and SV after having encrypted each copy of the SVK with the PVpuEK and SVpuEK for each particular Friend. After these processes are complete, SOTI alerts all of User1's Friends that User1 needs Recovery assistance. When the Friend that is User2 609 decides to assist User1, she starts by entering her MK and SOTI uses it to decrypt ePVprEK 614, as shown by Process Flow 622. SOTI then uses the generated PVprEK to decrypt User1's eSVK that resides in User2's PV 611, as shown by Process Flow 623. SOTI then uses the SVK to decrypt User1's eSVprEK 605 as shown by Process Flow 624, to generate the SVprEK, which is then used to decrypt all the IEKs in SV 604, as shown by Process Flow 625. SOTI then encrypts each Recovered IEK using User1's new Profile PVpuEK and deposits them in the new PV for User1, joining any new IEKs User1 has added to his new Profile since losing his old MK. Next, the SV update process is initiated by SOTI to ensure User1's new SV is in sync with his new PV. At this point, Recovery has been achieved and SOTI can erase the old Profile 602 so that going forward User1 only has one Profile. It is worth noting that the process of Recovery does not require any decryption or access of the Items pertaining to the lost MK. As long as the IEKs for these Items can be Recovered, the Items once again become accessible.

Still referring to FIG. 6, in the event that both User1 601 and User2 609 have lost their MKs, User2 609 cannot assist User 601 in Recovery until she has first achieved Recovery herself. In this case, both User1 601 and User2 609 can still achieve Recovery. Finding a lost MK is always one option of recovering lost data, but if that cannot happen, User2 609 would need to rely on her Friends (not shown on FIG. 6) to assist in her Recovery. User2's Friends would assist User2 609 and SOTI would use the SVK stored in User2's Friend's PV (not shown in FIG. 6) to decrypt eSVprEK 613, which would set off the chain reaction for User2 to Recover her SV 612. Once the eSVK in SV 612 had been Recovered, SOTI would then commence the Recovery process for User1's SV 604. Thus, a sequential chain reaction of Recovery processes would enable full Recovery for all Friends in the VCNOF. There is no numeric limit to the length of the VCNOF in enabling the chain reaction of Recovery; it is not limited to the two levels illustrated in this example.

Still referring to FIG. 6, an alternate configuration is to remove SV 604 and SVpuEK 608 completely, and replace eSVprEK 605 with another encrypted copy of the PVprEK. This copy of the PVprEK would be encrypted by the SVK from PV 611 to generate an ePVprEK—it would not be encrypted by the MK of User1 601. Thus, when User1 601 loses his MK and can no longer decrypt and access ePVprEK 606, his Friend, User2 609 could assist him by entering her MK to decrypt ePVprEK 614 which in turn would be used to decrypt the eSVK in PV 611, which in turn would be used to decrypt the ePVprEK that would be stored in place of eSVprEK 605. Once decrypted, this second copy of the PVprEK would also be used to access PV 603 as there would be no SV 604 in this configuration. This configuration would have a space savings by eliminating SV 604, and hence all SVs for all Users. It may also have some savings in process time.

Figure 7:
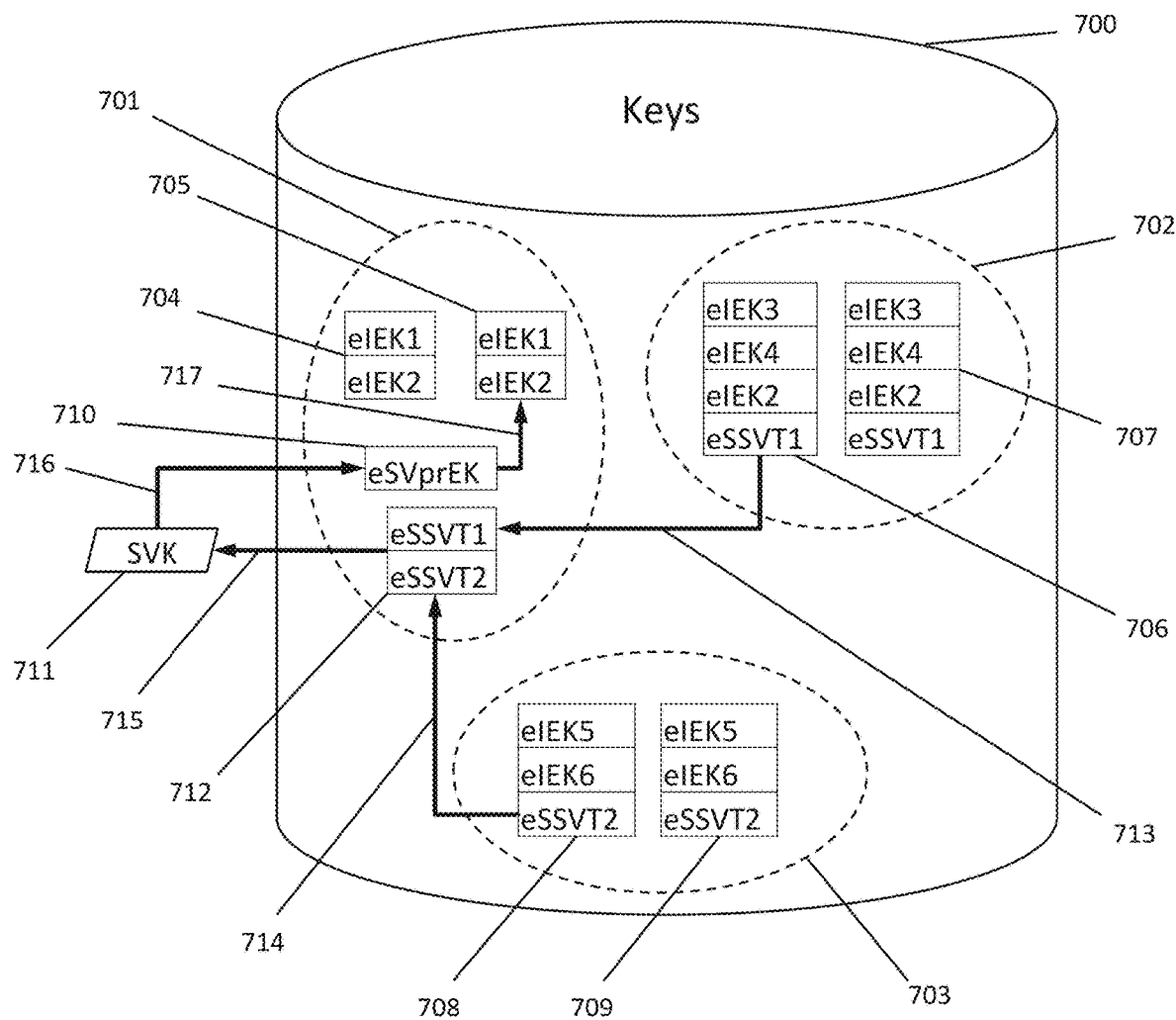
FIG. 7 is still further representation of interactions of some components of the invention.

FIG. 7 illustrates an alternative Recovery process, Distributed Recovery, that requires the assistance of more than one Friend to achieve Recovery, and hence Recovery is Distributed to multiple Friends. In Keys 700 there are three User Profiles, User1 Profile 701, User2 Profile 702 and User3 Profile 703 (The Profiles in this example are shown in a partial state and only include the components necessary to illustrate the Distributed Recovery process). Each User has both a PV and SV, with PV 704 and SV 705 belonging to User1, PV 706 and SV 707 belonging to User2 and PV 708 and SV 709 belonging to User3. As previously stated, User1's SV 705 can only be decrypted by a SOTI generated asymmetric SVprEK, which is stored under User1's Profile 701 in the encrypted state, eSVprEK 710. The key to decrypt eSVprEK 710 is a symmetric key, SVK 711, randomly generated by SOTI. SVK 711 is not stored in Keys 700 nor is it stored anywhere inside SOTI, outside of SOTI, or anywhere on the Network. Nor is SVK 711 stored physically anywhere outside the Network. Rather, SVK 711 must be recreated real-time during the Recovery process.

Still referring to FIG. 7, when initially being created, SVK 711 is scrambled into Tokens with the property that more than one Token is needed to re-create SVK 711. In this example, two Tokens are necessary for Recovery and two encrypted Tokens are shown in FIG. 7, Encrypted Scrambled Shadow Vault Token1, eSSVT1, in User2's PV 706 and Encrypted Scrambled Shadow Vault Token2, eSSVT2, in User3's PV 708. Neither SSVT1 nor SSVT2 are usable decryption keys. Rather, they are Scrambled Tokens that can be used to re-create SVK 711 only after being combined and unscrambled by SOTI.

Still referring to FIG. 7, when created, SSVT1 and SSVT2 are generated from SVK 711 using the mathematical principle of linear algebra, requiring the existence of at least as many independent equations as there are independent variables to solve for the variables. SVK 711 is scrambled with a number of variables, X, and a number of equations, N, whereby X is pre-selected by the User as the number of Friends needed to assist her before SVK 711 can be re-formed, and N represents the total number of direct Friends of the User. In the example, X is equal to 2 and N is unknown—the value of N is not necessary in this example to illustrate the process of Recovery. SOTI uses the SVK 711, along with introducing additional data that can be randomly generated or part of a deterministic algorithm, to assign values to the X variables, so that the SVK 711 can be reliably reconstructed once the values of all the variables are found, and then uses a table, such as the Vandermonde Matrix, to select coefficients for the variables to generate N independent equations. The result is N equations, or Tokens, which can be further scrambled by SOTI and then randomly distributed to User1's N Friends. The important property of this scrambling method is such that any X of the N Tokens can be combined to solve the set of equations and thus recreate SVK 711, but at least X Tokens are necessary to do so.

Still referring to FIG. 7, an alternate method of scrambling SVK 711 into Tokens would be to use Shamir's Secret Sharing methodology, which uses polynomials to essentially do the same mathematical scrambling process, since the coefficients generated using the Vandermonde Matrix are essentially based on a polynomial function. Alternately, any independent coefficient matrix other than Vandermonde Matrix could be used, which would make the Linear Equation method, or other mathematical procedure that generates N tokens when any X of them are needed to reconstruct the original value, could be used, which would make the method different from Shamir's Secret Sharing polynomial method. Regardless of which method is used, the result is that any X Tokens from the N Friends are needed to recreate SVK 711. Any Token by itself, or group of Tokens less than X, are essentially as difficult to unscramble as it would be to brute force decrypt state of the art encryption methodologies such as AES/Rijndael Again referring to FIG. 7, when User1 loses her MK, SOTI forces her to create a new MK. In the process, SOTI creates a new PV and SV, and randomly creates a new PVprEK, PVpuEK, SVprEK, SVpuEK and SVK, whereby the SVK is scrambled into N unique Tokens having X variables, and given to the Profiles of her N Friends, only two of which are shown in FIG. 7. It should be noted that this new SVK is for User1's new SV and it is not the SVK needed for Recovery of her currently lost MK. Thus, User1's Friends' Profiles have two SVKs for User1, the SVK for her old SV and the SVK for her new SV. SOTI does not erase the original PV or SV in User1's Profile 701. In addition, SOTI alerts the N Friends that User1 has lost her original MK and requests Recovery assistance. In this example, both User2 and User3 give their assistance to User1. User2 enters her MK, which is used to indirectly decrypt the eSSVT1 in her PV 706, generating the SSVT1, and upon doing so SOTI then re-encrypts the SSVT1 using User1's new PVpuEK and deposits the resulting eSSVT1 into temporary location 712 as depicted by Process Flow 713. Likewise, User3 enters his MK which is used to indirectly decrypt the eSSVT2 in his PV 708, generating SSVT2, and upon doing so SOTI then re-encrypts SSVT2 using User1's new PVpuEK and deposits it into temporary location 712 as depicted by Process Flow 714. At this point, User1, who may not be actively logged into SOTI and as such SOTI does not have her MK, has the requisite number of Tokens, two, which are necessary to recreate the SVK 711. When User1 logs into SOTI by entering her new MK, SOTI uses the MK to decrypt eSSVT1 and eSSVT2 in temporary location 712, whereby the two unencrypted Tokens are then used to re-create the SVK 711 as depicted by Process Flow 715, which is then used to decrypt eSVprEK 710, as depicted by Process Flow 716. The generated SVprEK is then used to decrypt SV 705, hence the contents of SV 705, namely eIEK1 and eIEK2, as shown by Process Flow 717. Once decrypted, SOTI then re-encrypts IEK1 and IEK2 using the new PVpuEK, and then deposits them into User1's new PV, which also results in a newly updated SV. At this point, User1 has achieved Recovery.

Still referring to FIG. 7, an important benefit of the invention is that there is no limit to the number of MKs a User can lose, without having first achieved Recovery for the first lost MK. SOTI continually recreates new Profiles with the User, each having its own Recovery Process, so that all information in all Profiles, for all the lost MKs, can be Recovered by assistance from X Friends. In addition, when a Friend assists the User in Recovery, all Items pertaining to all MKs that were lost after the Friend was added to the User's VCNOF, are Recovered with that Friend's assistance.

Still referring to FIG. 7, if either User2 or User3 also lose their MKs, they could still help User1 as long as they had set up their own Recovery process by creating a VCNOF of their own prior to losing their MKs. In the case of User2 losing her MK, she would request assistance from her Friends and once she recovers her SV, she would then have the ability to help User1 by Recovering the SSVT1 in her SV 707. Likewise, if User2's Friends lose their MKs they can use their Friends for Recovery and after which help User2 who could then subsequently help User1. As previously shown, the attribute of Recovery that it is viral in nature and forms a chain reaction, is not affected by the inclusion of scrambling the SVK into multiple Tokens and requiring assistance from more than one Friend.

Still referring to FIG. 7, there are benefits of Distributed Recovery requiring multiple Friends assisting with multiple Tokens before Recovery can be achieved. One such benefit pertains to Social Hacking. Another benefit pertains to the Human Firewall, which is addressed in a later portion of this document. Social Hacking occurs when a Hacker gains access to a User's SOTI password but not the User's MK. The Hacker can pose as the User pretending to have lost his MK and requesting assistance from the User's Friends. Because the Recovery process requires the User—in this case the Hacker—to create a new MK to facilitate the Recovery process, the Hacker will have created a new PV for the User's account. If, in the case of single person Recovery, after a single Friend assists in Recovery, the entire encrypted contents of the User's Profile will be decrypted and re-encrypted using the new MK, which will be in the possession of the Hacker. The Hacker could achieve Recovery if the Friend who assists the User fails to voice verify that the request is genuinely from the real User and not a Hacker. Alternatively, if the Friend is working in conjunction with the Hacker, and hence the phrase "Social Hacking", the User's account will still be Hacked. Although Social Hacking is a highly improbable possibility to begin with, even for single person Recovery, the more Friends the User requires for Recovery the lower the odds of success of a Social Hacking attack.

Social Hacking can be reduced by other means as well. For instance, SOTI can require Users to re-enter their SOTI Password and then their MK, thereby eliminating the possibility of a Hacker getting in during an open Browser session. The process for Password reset or MK reset when the original MK is lost could also require Two Factor Authentication, further reducing the risk of a Hack. Thus, multiple methods could be used to complement the Recovery process to mitigate the threat of Social Hacking.

It will be apparent to a person skilled in the art of the invention that alternate configurations than what is detailed in FIG. 7 could result in the same level of benefits of security and Recovery.

Figure 8:
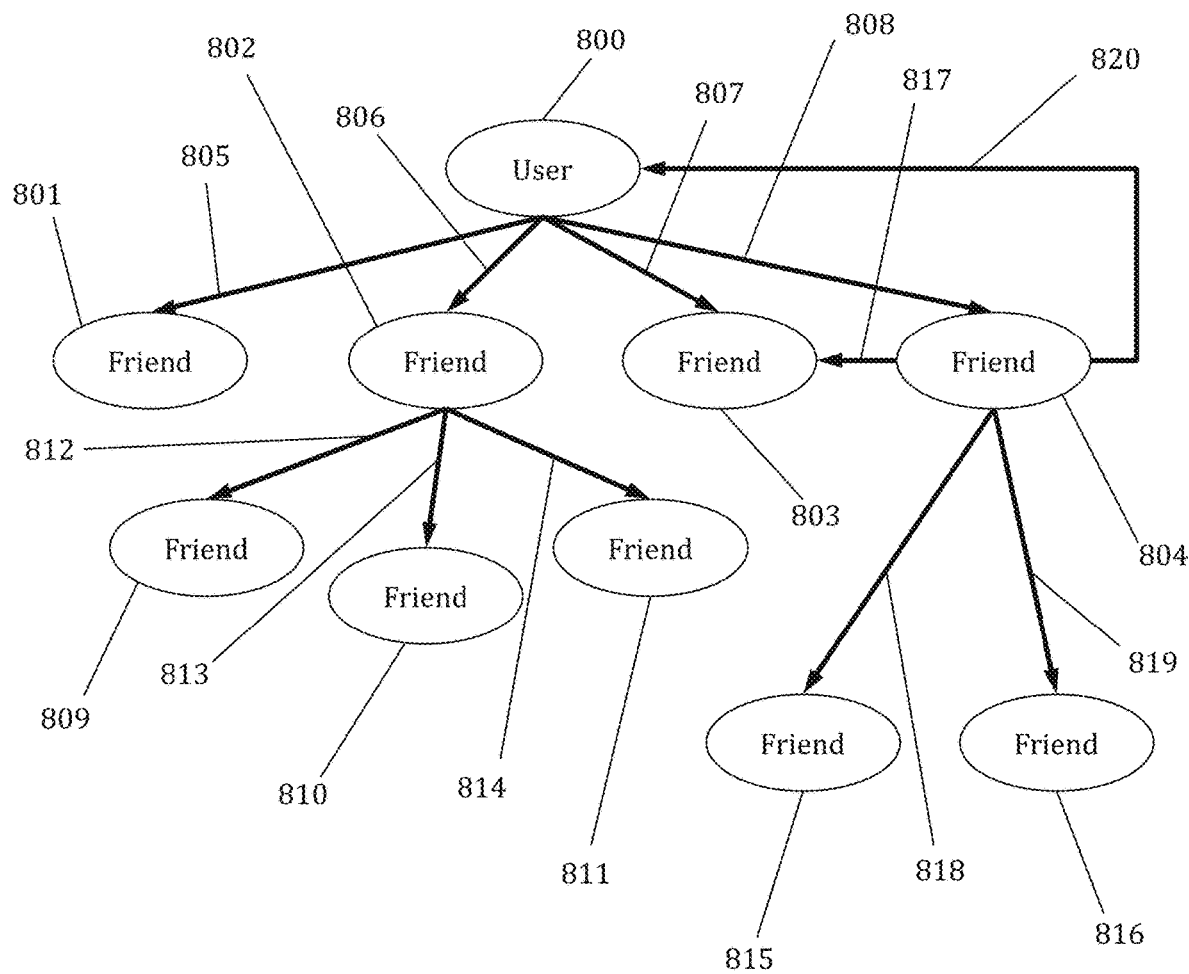
FIG. 8 is a representation of the viral network properties of the invention.

FIG. 8 further highlights some aspects of the viral nature of the VCNOF for Recovery using single person Recovery, or X=1. User 800 has four direct Friends that can assist him in recovery, Friend 801, Friend 802, Friend 803 and Friend 804 as shown by Connections 805, 806, 807 and 808 respectively. Only these four Friends can directly assist User 800 in Recovery and as such they are Tier 1 Friends, having the property of being directly connected to User 800 in the VCNOF and being the only Friends able to directly assist User 800 in Recovery. The Recovery process can be set up so that as few as any single one of these Friends, 801, 802, 803 and 804, is needed to enable Recovery for User 800, or it could be set up so that more than one of these four Friends are required to assist User 800 before Recovery for User 800 is achieved. Recovery assistance requires that the Tier 1 Friend enter their MK, and hence requires that the Friend has not lost his MK.

Still referring to FIG. 8, if any of the four Tier 1 Friends, 801, 802, 803 or 804 loses their MK, they cannot assist User 800 in Recovery until they themselves have achieved their own Recovery. To do so, they initiate their own Recovery process with their own, specific, Tier 1 Friends, which are distinct from the Tier 1 Friends of User 800. For example, if Friend 802 lost his MK, he would initiate Recovery and alert his Tier 1 Friends, which are Friend 809, Friend 810 and Friend 811 as shown by Connections 812, 813 and 814 respectively. Again, assuming single person Recovery, if any of these three Friends, Friend 809, Friend 810 or Friend 811 have not lost their MKs, they can assist Friend 802 in Recovery. Once Friend 802 has achieved Recovery, he can then assist User 800 in Recovery. Since any of these three Friends, Friend 809, Friend 810 and Friend 811, cannot directly assist User 800 in Recovery but can indirectly do so by assisting Friend 802, who can then directly assist User 800, these three Friends are considered Tier 2 Friends of User 800. Again, they are Tier 1 Friends to Friend 802.

Still referring to FIG. 8, in this example Friend 801 and Friend 803 do not have any Tier 1 Friends of their own to assist them in Recovery. If either of these two Friends, Friend 801 or Friend 803, were to lose their MK, they could not take advantage of the Recovery process themselves for their own lost data, nor could they subsequently assist User 800 in Recovery, unless they find their lost MK.

Again referring to FIG. 8, Friend 804 has four Tier 1 Friends, Friend 803, Friend 815, Friend 816 and User 800 as shown by Connections 817, 818, 819 and 820 respectively. This shows the recursive property of the VCNOF in that two people can both choose each other as Tier 1 Friends. In this case, User 800 has Friend 804 listed as a Friend as depicted by Connection 808, while Friend 804 has User 800 as a Friend as depicted by Connection 820. If Friend 804 were to lose his MK, User 800 could assist him in Recovery as long as User 800 himself had not lost his MK. If both User 800 and Friend 804 lose their MKs simultaneously, then neither could assist the other until one of the two achieve Recovery through their other Tier 1 Friends. In the case of User 800 needing Recovery, Friend 801, Friend 802 or Friend 803 would need to offer Recovery assistance and at that point User 800 could assist Friend 804 in Recovery. Alternatively, Friend 804 could first receive Recovery assistance from Friend 803, Friend 815 or Friend 816 and could then in turn assist User 800 in Recovery, as shown by Connection 817, Connection 818 and Connection 819, respectively.

Still referring to FIG. 8, the scope of the VCNOF is not limited in size to the example shown. The level of Tiers could continue to a limitless level and each person can select as many Tier 1 Friends as they like. Also, there could be any number of recursive viral connections even to the point that a closed group of people could all agree to be Tier 1 Friends to each other, resulting in a network of any size that had no Tiers beyond Tier 1. In either case, the probability of Recovery could still be significantly high as long as the total number of Friends in the network is fairly large. Assuming single person Recovery, the formula for the odds of losing data is equal to the probability that any single person loses their key raised to the power of N, where N represents the total number of Friends plus the User, in the VCNOF. For example, assuming the probability that any single User loses their MK is 30% and there are 6 Users in the VCNOF, all connected as Tier 1 Friends, then the probability that data will lost is $0.3^6$ (0.3 raised to the power of 6), or 1 in 1372.

As the number of Tier 1 Friends grows, and the Tiers themselves grow, the probability of the original User not achieving Recovery rapidly diminishes. For example, if the original User has 5 Friends who each have 5 unique Friends, for a total of 31 unique Users in the VCNOF, the probability of losing data for the original User is $0.3^{31}$, or less than 1 in 16 quadrillion.

When Distributed Recovery is deployed—where X is greater than 1—the calculation of the probability is more complex. It is represented by the formula:

$$p_{L+1} = p_0 \sum_{i=0}^{x-1} \left[\left(\frac{N!}{(N-i)!i!}\right) p_L^{(N-i)} (1-p_L)^i\right]$$

whereby L represents the Tier with the original User being Tier 0, and $p_0$ represents the probability that any single User will lose their MK (30%). Using this formula, the odds become 1 in 92,378,177 that the original User will lose data, for two Tiers with 5 Tier 1 Friends and 25 Tier 2 Friends.

Figure 9:
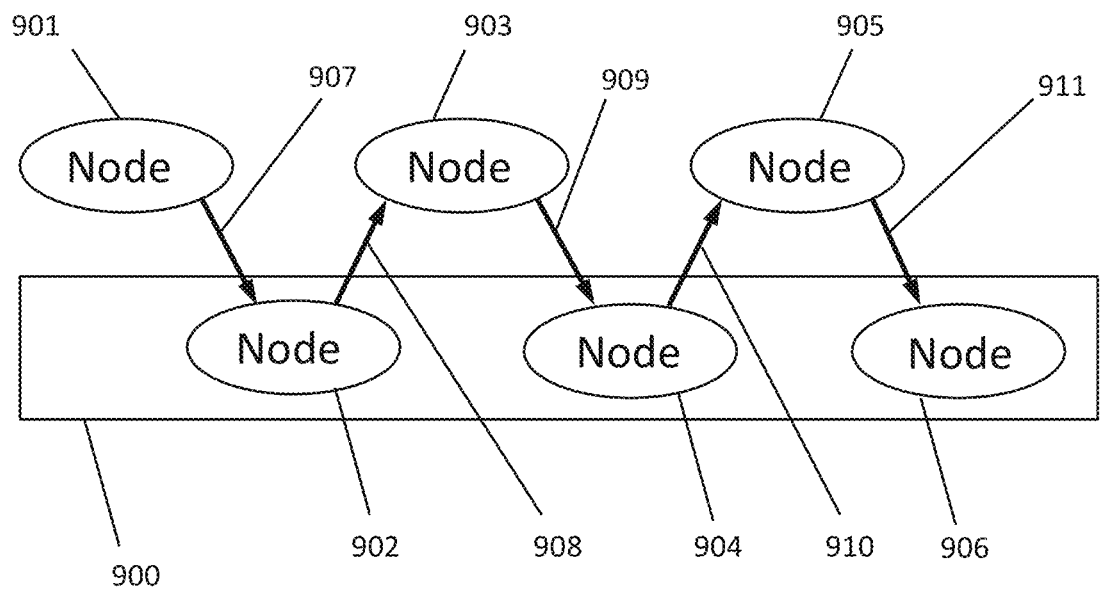
FIG. 9 is a representation of the functioning of the viral network properties of the invention.

FIG. 9 is a conceptual illustration of the unique interdependency of VCNOF Nodes both inside and outside SOTI 900. Nodes are defined as action points in a VCNOF sequential Recovery chain reaction whereby an event must occur at each Node prior to enabling the action event to occur at the subsequent Node. In this figure, Node 901, Node 903 and Node 905 represent a Tier 2 Friend, Tier 1 Friend and the User, respectively. As such, these Nodes exist outside SOTI 900 and are human Nodes, with each representing a different User of SOTI 900 and each connected to both the prior and later human Nodes by a Tier 1 connection. Conversely, Node 902, Node 904 and Node 906 represent Nodes that exist in SOTI 900. At Node 902, the Shadow Vault Key (SVK) is stored for the Shadow Vault belonging to the User represented by Node 903, but the SVK at Node 902 is indirectly encrypted by the MK of the person represented in Node 901. (There may be more than one Key in a chain that eventually decrypts the SVK.) Similarly, Node 904 represents the SVK for the SV belonging to Node 905, but is encrypted by the MK of Node 903. This property of alternating arrangement of human to SOTI Nodes continuing for all Nodes in the VCNOF along with the SVKs stored at SOTI Nodes, and being encrypted by the prior human Node but belonging to the subsequent human Node, is a unique aspect of the invention. Additionally, all the MKs needed to decrypt each and every SVK stored at internal SOTI Nodes are stored outside SOTI 900, in the preceding human Nodes. Thus, each link in the chain of the connected network has in essence what is the basis of a Human Firewall whereby in order for the information in each Node in the chain to be unlocked, the preceding human Node does the unlocking by manually entering his MK. When any human in the chain fails to enter their MK, the process of unlocking downstream Nodes stops.

Again referring to FIG. 9, the process of a two Tiered Recovery highlights how the alternating Node, chain reaction Recovery process works. The Tier 2 Friend that is Node 901 enters her MK as depicted by Process Arrow 907, to assist her Friend, Node 903 in Recovery. After receiving the MK from Node 901, Node 902, which is part of SOTI 900, uses it to decrypt the SV belonging to the Friend that is Node 903 as depicted by Process Arrow 908. Once the SV of Node 903 has been Recovered, the Tier1 Friend represented as Node 903 then uses his Recovered SV to assist his Friend, Node 905, by manually entering his MK as represented by Process Arrow 909. At Node 904, SOTI 900 uses the MK from Node 903 to decrypt the SV for Node 905 and passes the Recovered SV to Node 905 as depicted by Process Arrow 910, where Node 905 is the original User who lost her MK. Thus, the User represented by Node 905 has achieved Recovery, as has the Tier1 Friend represented by Node 903. Now that she has achieved Recovery, the User represented by Node 905 can use her MK to assist other Users (who are not shown in FIG. 9) in Recovery as represented by Process Arrow 911.

Still referring to FIG. 9, one of the benefits of the invention is that human Nodes become a sort of Human Firewall to the Recovery chain reaction process. However, in the case where Distributed Recovery is not being used, and only the assistance of a single Friend is required, the Human Firewall isn't as complete as it could be. For example, when Node 901 enters her MK and SOTI uses it to unlock the SV belonging to Node 903, SOTI has in its possession all the decrypted contents of said SV, which include any SVKs to Users who have selected Node 903 as a Recovery Friend. At that point, SOTI could use these SVKs to unlock the SVs of these other Users. SOTI would not only have access to the full contents of each User's PV, and hence their Items, but also could continue unlocking SVs pertaining to the SVKs made available with each unlocked SV. Hence, as long as single person Recovery is used by each User, SOTI could continue the chain reaction of decrypting and accessing these User's information without the assistance of any humans. When single person Recovery is replaced with Distributed Recovery, where multiple Friends are required to achieve Recovery, SOTI can no longer continue the chain reaction of decrypting SVs on its own, and the Human Firewall becomes more complete.

Figure 10:
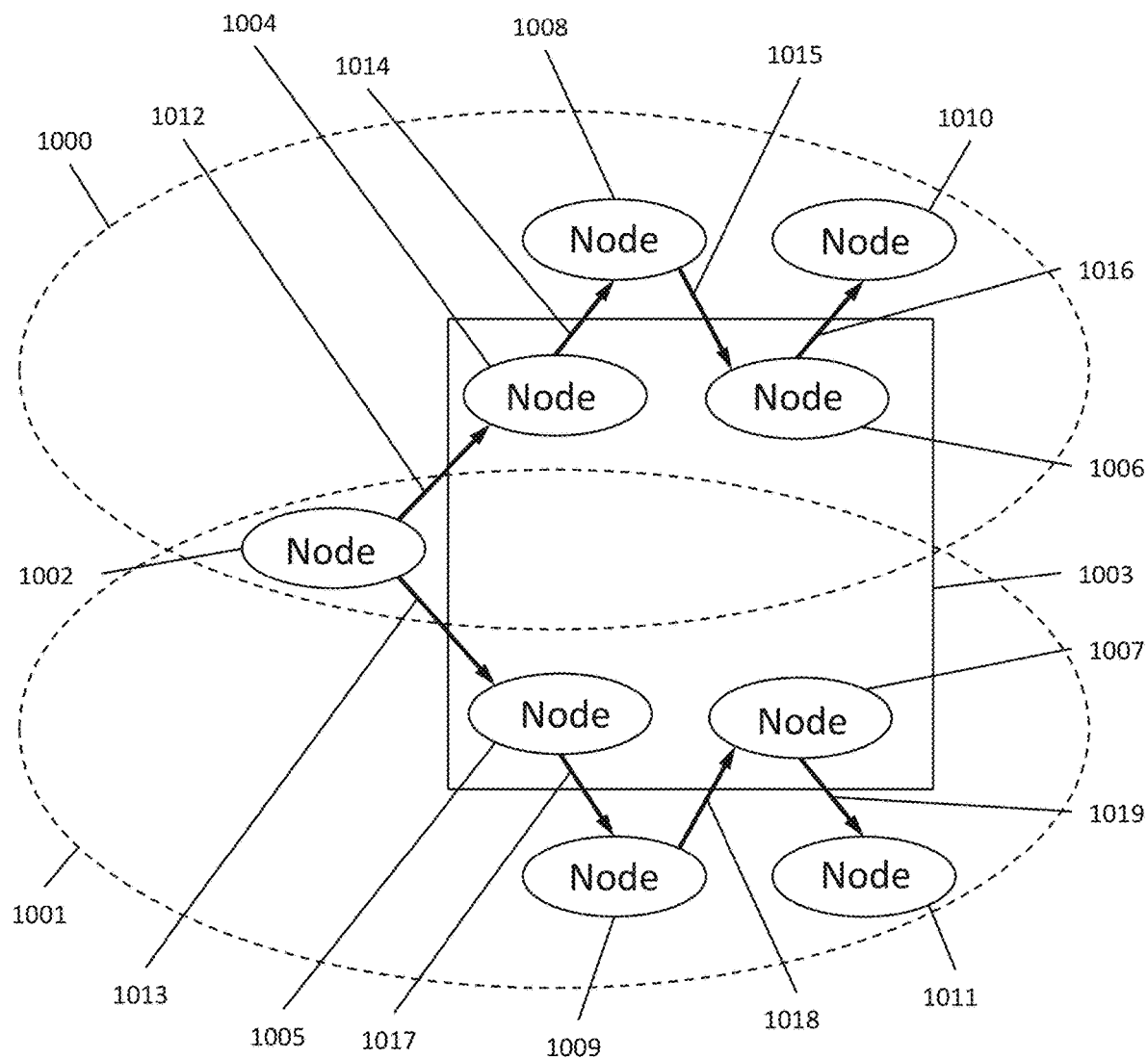
FIG. 10 is a further representation of the functioning of the viral network properties of the invention.

FIG. 10 shows that multiple Recovery chain reactions can be initiated simultaneously with the MK entry of a single human Node. In FIG. 10, there are two Recovery chain reactions, Chain Reaction 1000 and Chain Reaction 1001. While each of these chain reactions is unique, both have the same human Node as the initiation point, which is Node 1002. SOTI 1003 has four Nodes in it, Node 1004, Node 1005, Node 1006 and Node 1007. All the other Nodes are human Nodes, which in addition to Node 1002 include Node 1008, Node 1009, Node 1010 and Node 1011. The User that is Node 1002 enters her MK one time and by doing so, initiates both Chain Reaction 1000 and 1001 simultaneously. Node 1004 and Node 1005 are distinct from each other in that each represents the decryption of different SVs belonging to different human Users. Node 1008 and Node 1009 are different human Users, each having a different SV. Thus, the MK entered by Node 1002 unlocks two different SVs represented by Process Arrow 1012 and Process Arrow 1013, respectively. From this point onward, the two chain reactions, Chain Reaction 1000 and Chain Reaction 1001, are distinct. Node 1004 is different from Node 1005, Node 1008 is different from Node 1009, Node 1006 is different from Node 1007 and Node 1010 is different than Node 1011. Process Arrow 1014, Process Arrow 1015, and Process Arrow 1016 illustrate the downstream flow of Chain Reaction 1000. Process Arrow 1017, Process Arrow 1018, and Process Arrow 1019 illustrate the downstream flow of Chain Reaction 1001. In this example, a single human Node initiates two distinct Recovery chain reaction processes, but the invention need not be limited by either the number of Recovery chain reactions initiated by a single Node, or the number of Nodes that can initiate these chain reactions.

The multiple chain reaction property of Recovery in FIG. 10 highlights a unique aspect of the invention in that the VCNOF has a duality of benefits. Not only does a larger and deeper VCNOF reduce the probability of a particular User not Recovering data from a lost key as her VCNOF gets larger, but it also has the benefit that a single User can initiate a Recovery process that could effectively assist in Recovery for the entire Network of SOTI Users. Similar to the duality of a family tree in that the connections going backward grow with each generation of ancestors and also grow forward with each generation of descendants, VCNOF has the same growth properties. In going upstream, the deeper the VCNOF, the more Friends that can assist a User in Recovery, and in going downstream, the more Users a single Friend can assist in Recovery. Since there are no limits to the number of Friends each User can have, eventually, the VCNOF can extend to the entire range of Users of SOTI.

Figure 11:
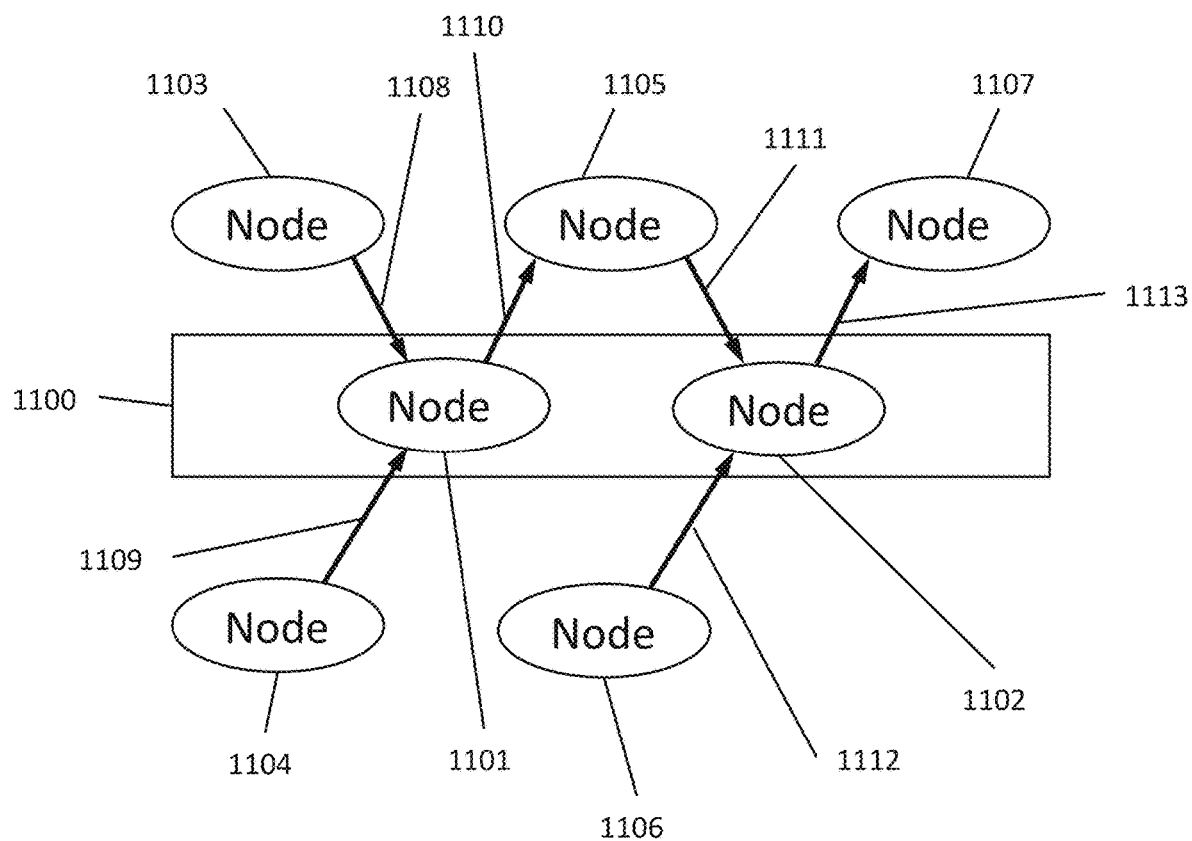
FIG. 11 is still a further representation of the functioning of the viral network properties of the invention.

FIG. 11 illustrates the impact of Distributed Recovery on the Recovery chain reaction process. SOTI 1100 has two Nodes, Node 1101 and Node 1102. The human Nodes are represented by Node 1103, Node 1104, Node 1105, Node 1106 and Node 1107. In this example, two Friends are required to enable Recovery for each User. The Recovery chain reaction starts when the Friend represented by Node 1103 enters his MK as shown by Process Arrow 1108, which Node 1101 uses to decrypt the Token in the PV of Node 1103. Node 1101 then uses the PVpuEK belonging to Node 1105 to re-encrypt the Token and deposits it in the PV belonging to Node 1105. Being two person Recovery, the Token, by itself, is of no use to anyone, including SOTI 1100, in terms of Recovery of the SV belonging to Node 1105. Thus, SOTI 1100 cannot Recover the SV belonging to Node 1105. In addition, because the Token is re-encrypted, SOTI 1100 no longer has access to the Token itself as soon as this action is complete, which, because it occurs real-time, is essentially instantaneous. At an independent point in time, the Friend represented by Node 1104 gives her assistance in Recovery to the human represented by Node 1105. Node 1104 enters her MK, as shown by Process Arrow 1109 and Node 1101 uses it to decrypt the Token in her PV. Being two person Recovery, just as the first Token was useless by itself, this Token also cannot be used by SOTI 1100 to continue with the Recovery process of the SV belonging to Node 1105. As with the first Token, Node 1101 re-encrypts this second Token using the PVpuEK belonging to Node 1105 and deposits it into the PV belonging to Node 1105. At this point, the SV belonging to Node 1105 has not been Recovered. However, both Tokens have been encrypted and deposited into the PV belonging to Node 1105. When Node 1105 enters his MK, Node 1101 uses it to decrypt the two Tokens in the PV belonging to Node 1105. Node 1101 combines the two unencrypted Tokens to create the SVK associated with the SV belonging to Node 1105 and unlocks this SV, which is represented by Process Arrow 1110. At this point, the chain reaction process at Node 1101 has been completed and passes to the downstream Nodes, Node 1105 and Node 1106. Node 1105 and Node 1106 enter their MKs as represented by Process Arrow 1111 and Process Arrow 1112, respectively, but at different points in time. Node 1102 independently decrypts the two Tokens for the PVs belonging to Node 1105 and Node 1106, re-encrypts them using the PVpuEK belonging to Node 1107, and then deposits the Tokens into the PV belonging to Node 1107. When Node 1107 enters her MK, Node 1102 uses it to decrypt both Tokens, combine them to form the SVK, then uses the SVK to decrypt the SV belonging to Node 1107 and achieve Recovery for Node 1107 as represented by Process Flow 1113.

Still referring to FIG. 11, the process of Distributed Recovery illustrates that the Human Firewall condition is more fully in effect compared to the single person Recovery instance. Even after Node 1101 or Node 1102 recombines the Tokens into a SVK and unlocks the corresponding SV, unlike the single person Recovery situation, SOTI 1100 cannot continue the chain reaction process without the contribution of the downstream human Nodes. The contents of the decrypted SV will contain other Tokens to other SVs, but none of them can be used by SOTI 1100 because any single SV will not have more than one Token for any individual SV. A human Node must enter a MK to unlock a second Token. Thus, SOTI 1100, or a Hacker, could not continue the chain reaction process of decrypting and accessing downstream SVs, and bypassing downstream Human Firewall Nodes.

Still referring to FIG. 11, one means of bypassing the Human Firewall, even with Distributed Recovery, is for SOTI 1100—or a Hack—to store MKs, Tokens, or SVKs as they are entered or become temporarily available in an unencrypted state. Over time, the recording of these unencrypted keys would enable SOTI 1100, or a Hack, with a sufficient number of keys to decrypt a large portion of the encrypted data. If there were a means of SOTI 1100 not executing the encryption/decryption function and instead passing it to the User, then it would not be possible for SOTI 1100 or a Hacker to record unencrypted keys. Such a change in the process would eliminate this method of bypassing the Human Firewall condition.

Figure 12:
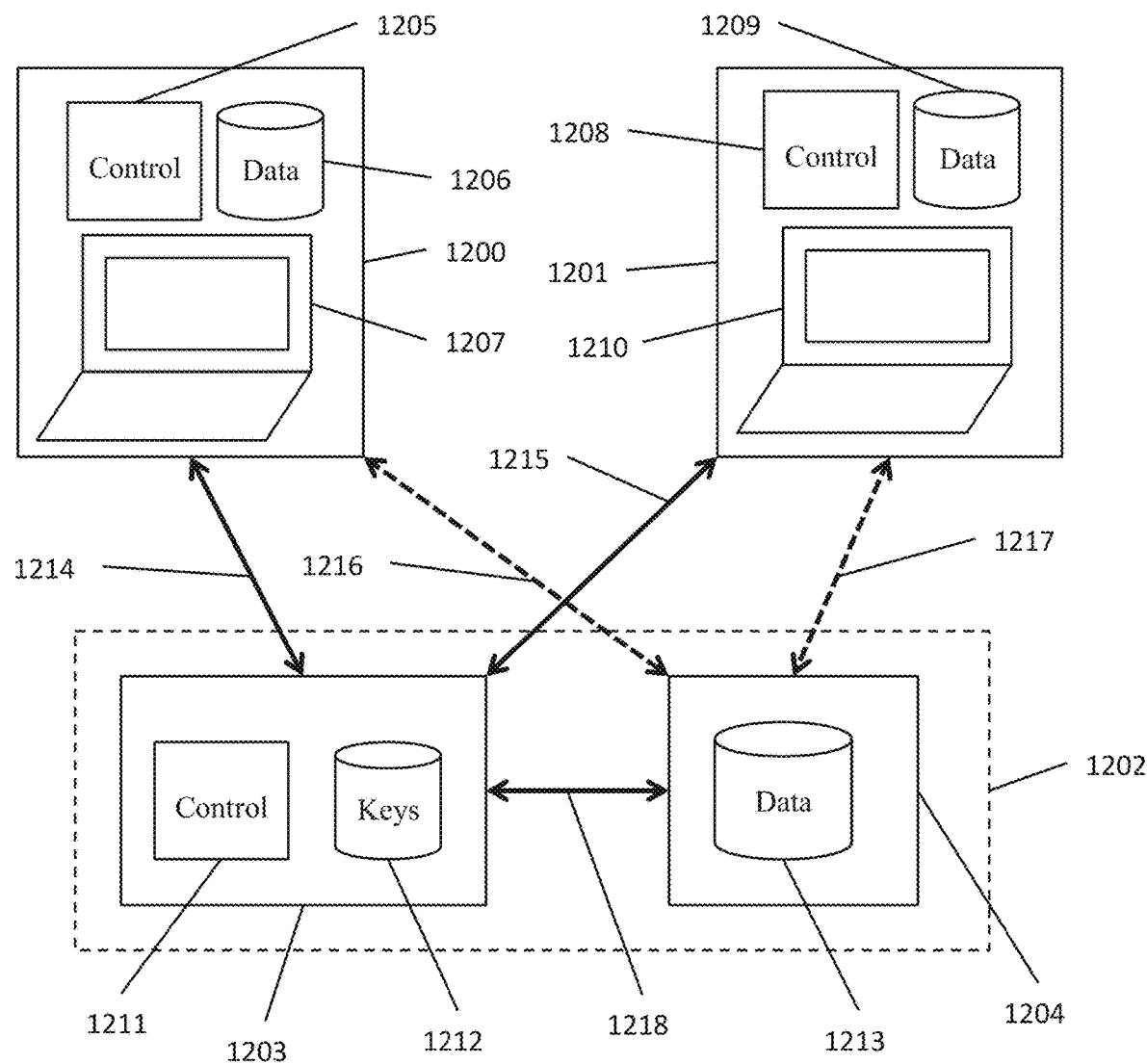
FIG. 12 is an alternate configuration of the invention.

FIG. 12 illustrates an alternate configuration of the invention that allows all encryption and decryption to occur at the device in the possession of the User, and not inside SOTI. In this example, there are two Users, one at client side Device 1200 and the other at client side Device 1201. Both Device 1200 and Device 1201 are connected to Network 1202, SOTI 1203 and System 1204, whereby System 1204 could be a third party document storage provider. A unique aspect on the configuration of FIG. 12 is that a portion of the Control and Data of the invention have been shifted from SOTI 1203 to the client side, and is located in Device 1200, as Control 1205 and Data 1206 for Device 1200. In addition, Device 1200 also contains Interface 1207 which is used by User1 to interact with all systems on Network 1202 as well as with Device 1200 itself. Similarly, Device 1201 contains Control 1208 and Data 1209, along with Interface 1210. In this configuration, Control 1205 and Control 1208 are used by User1 and User2, respectively, to enable encryption and decryption to occur at their client side Device 1200 and Device 1201, respectively, and not at Control 1211 located on SOTI 1203. In this example, all encrypted EKs for the invention are stored in Keys 1212 and eItems can be stored either in Data 1213 on System 1204 or Data 1206 and Data 1209 on Device 1200 and Device 1201, respectively. Data 1206 and Data 1209 could be backups for User1 and User2, respectively, of the primary repository where User1 and User2 keep their data, which is Data 1213. Or, eItems can be randomly or deterministically distributed in any combination to Data 1213, Data 1206 and Data 1209 so that any particular User of SOTI 1203 would not know where his encrypted Items are stored or backed up. In such a configuration, User1 and User2 would interface with SOTI 1203 as shown by Connection 1214 and Connection 1215 for all data requests, respectively. However, it is also possible that User 1200 and User 1201 may also interface directly with System 1204 through Connection 1216 and Connection 1217, respectively, for slightly different configurations. SOTI 1203 and System 1204 can interact directly in dealing with User requests as shown by Connection 1218.

Still referring to FIG. 12, a primary benefit of locating portions of Control of the invention to Control 1205 and Control 1208 is to eliminate the possibility that SOTI 1203 ever comes in contact with any unencrypted information, either Items or Keys. This eliminates the possibility that Administrators of SOTI 1211, or a Hacker of SOTI 1211, can modify SOTI 1211 to record either unencrypted Keys or Items for later use, and thus extends the concept of the Human Firewall to a higher degree of completeness. For example, when User1 creates his MK using Control 1205, Control 1211 never comes into temporary possession of the unencrypted MK. Likewise, when User1 encrypts an Item, it is done on client Device 1200 by Control 1205 and not on SOTI 1203, and only afterward are the eItem and eIEK passed to SOTI 1203. When User1 wishes to access an existing eItem, regardless if it is stored on Data 1206, Data 1212 or Data 1209, SOTI 1203 does not do the decryption. Rather, User1 would initiate the process through Interface 1207. The request for the eItem would pass to SOTI 1203 through Connection 1214. Control 1211 would identify the location of the eItem, regardless of where it is stored, and locate the correct eIEK stored on Keys 1212. Control 1211 would collect both the eItem and the eIEK, which Control 1211 could not decrypt because it cannot decrypt the eIEK without the MK, and pass them to Device 1200. Control 1205 would use the MK entered by User1 to decrypt the eIEK, which would then be used to decrypt the eItem. If User1 wished to update the Item and then re-deposit an encrypted version of it, the encryption would occur on Device 1200 by Control 1205. Once encrypted, the eItem would be passed to SOTI 1203 through Connection 1214 and Control 1211 would deposit the eItem in its proper location, as determined by Control 1211, which may be Data 1213, Data 1206 or Data 1209.

Still referring to FIG. 12, as stated, one configuration could be that Data 1206 only contains eItems that belong to User1, either as a primary repository or a backup repository. Or, SOTI 1203 could randomly or deterministically distribute eItems anywhere to any connected eItem storage on the Network 1202 so that no User of SOTI 1203 knows where his eItems are stored or whose eItems are stored on the client side Device he is using. For example, User1 using Device 1200 may have eItems belonging to User2 stored on Data 1206, where Data 1206 may or may not also contain User1's eItems, but User1 may not know about User2's eItems on Data 1206, and may also not know of his own eItems on Data 1206. Since all eItems are in an encrypted state on Device 1206, they are unusable to User1 without the assistance of SOTI 1203 in sending the associated eIEK that is stored on Keys 1212. Even if the eItems on Data 1206 belong to User1, he could not decrypt and use the eItems because he does not have the proper eIEK to do so, which is controlled by Control 1211 and stored on Keys 1212. Likewise, User2 cannot decrypt any eItems on Data 1209. This property, that despite eItems being stored on the local storage connected to the Device to which a User has access but the User of that Device cannot decrypt the eItems, enables SOTI 1203 the flexibility of using Random Distribution, whereby Random Distribution is the ability to locate any encrypted information anywhere in the Network, including on the Devices being used by Users. Random Distribution is similar to existing Torrent methodologies in that each User is storing information that is usable by other Users. In applying Random Distribution, SOTI 1203 must ensure that the encrypted information cannot be deleted or altered. Storing each piece of encrypted data in multiple locations and using version control to determine if an inappropriate change or deletion has occurred is one method of safeguarding against inappropriate changes to the encrypted data. Another, similar methodology would be to use Block Chain methodology on the data.

Figure 13:
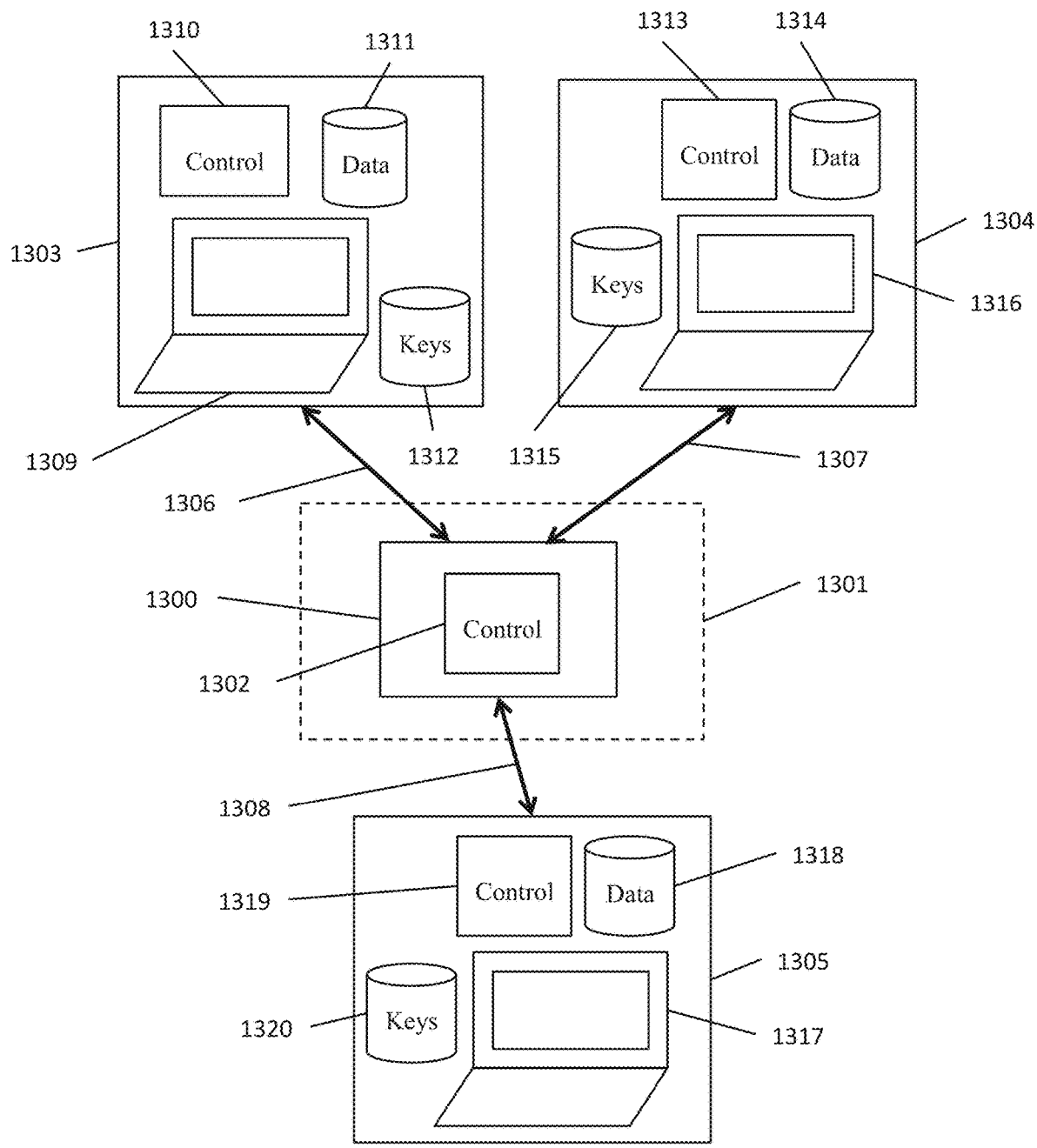
FIG. 13 is another alternate configuration of the invention.

FIG. 13 is a further extension of Random Distribution. In this example, there is no centrally located repository for encrypted Items or encrypted Keys in SOTI 1300 on Network 1301. Only portions of Control 1302 are on SOTI 1300. All Items and Keys are Randomly Distributed to the Devices being used by the Users, or other parties on Network 1301. In this example, User1, User2 and User3 and using client side Device 1303, Device 1304 and Device 1305, respectively, which are connected to Network 1301 and hence SOTI 1300 through Connection 1306, Connection 1307 and Connection 1308, respectively. Device 1303 not only includes Interface 1309 with which User1 interacts with SOTI 1300, but also Control 1310, which manages his personal encryption and decryption processes, Data 1311, which contains Randomly Distributed eItems for Users of SOTI 1300, and Keys 1312, which contains Randomly Distributed eKeys for Users of SOTI 1300. Similarly, Device 1304 being used by User2 contains Control 1313, Data 1314, Keys 1315 and Interface 1316, all of which have similar functionality to Device 1303. Likewise for User3, Device 1305 contains Interface 1317, Data 1318, Control 1319 and Keys 1320, all of which have similar functionality to Device 1303. Thus, each of the three Devices connected to SOTI 1300 have repositories for both encrypted Items and encrypted Keys. Not only can SOTI 1300 Randomly Distribute eItems to client side Devices, it can also Randomly Distribute eKeys to these Devices as well. However, Control 1310, Control 1313 and Control 1319 only execute encryption/decryption for the Items and Keys belonging to each respective User Profile of the User operating the Device 1303, Device 1304 and Device 1305, respectively. Encryption/decryption is handled entirely at the localized Client side Device, and is limited to the Profile of the User operating the Device.

Still referring to FIG. 13, User1 using Device 1303 generally cannot, without the assistance of SOTI 1300, access his personal encrypted Keys or encrypted Items because SOTI 1300 would most likely not store User1's information on the same Device 1303 through which User1 is interfacing with SOTI 1300. (There are possible configurations where User1 would be allowed to access his personal eKeys and, or eItems without involvement of SOTI 1300, such as, but not limited to, when backup copies of the User's eKeys and eItems are stored on his local Device.) Rather, SOTI 1300 would store User1's encrypted Keys on either Keys 1315 or Keys 1320, and possibly even both. SOTI 1300 would store User1's encrypted Items on Data 1318 or Data 1314 or possibly some combination of both. In this configuration, SOTI 1300 acts as a switchboard that fetches particular encrypted keys and Items to route them to a particular User, who then decrypts the Key and Item locally. For example, suppose User1 uses Interface 1309 to request the retrieval of eItem1. SOTI identifies the location of eItem1 as well as the location of eIEK1 and fetches them. eIEK1 could be on Keys 1315 or it could be on Keys 1320, while eItem1 could be on Data 1314 or it could be on Data 1318. Regardless, neither User1 nor Control 1310 generally know the location of these two pieces of data. (There are possible configurations where User1 or Control 1310 do know the location even if not stored on either Data 1311 or Keys 1312.) When eIEK1 and eItem1 are delivered to Device 1303, Control 1310 decrypts the eIEK1 to generate IEK1, which in turn is used to decrypt eItem1 to generate Item1. In this manner, all encrypted Items and Keys for all Users of SOTI 1300 are Randomly Distributed to the Devices used by all the Users, whereby no single User knows the location of either their eKeys or eItems, and no single User knows what eKeys and eItems are stored on the Device he is using (Again, there are configurations where the Users do know some of this information). If controls are put into place to protect against the deletion or editing of encrypted information, such as those previously mentioned, and there is sufficient backup of information though out the Randomly Distributed information, the information is secure and safe. The invention is not limited to the configuration of Random Distribution described in this example and can include any configuration or aspects of Control, Key storage, or any processes described or inferred in this document.

Figure 14:
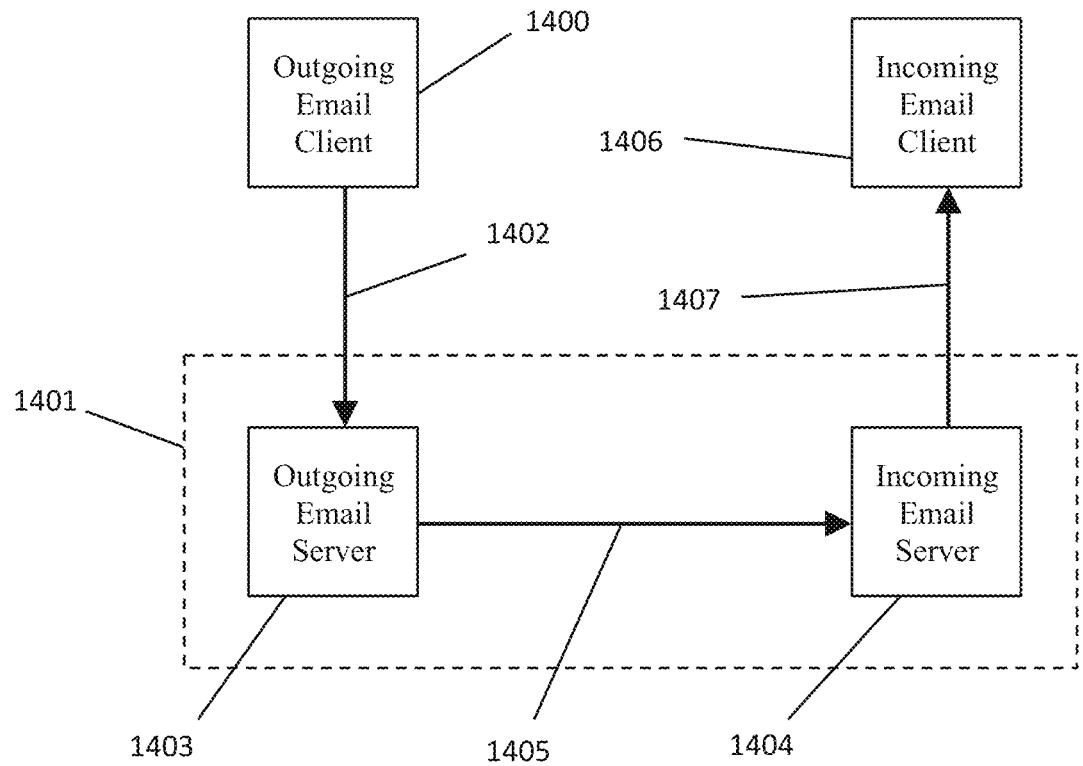
FIG. 14 is a representation of process and function of current email technology.

FIG. 14 is a representation of general industry standard methodology for email communication between two parties connected to a Network. In this example, a User who is sending an email is using Outgoing Email Client (OEC) 1400, which is an electronic device that is connected to the Network 1401 as depicted by Arrow 1402. The User composes the email on OEC 1400 and sends the email. Once sent, the email is transmitted from OEC 1400 to the Outgoing Email Server (OES) 1403 associated with the User's email account, as shown by Arrow 1402. While in transmission, emails generally abide by Transport Layer Security (TLS) encryption. Transmission represented by Arrow 1402 would generally use TLS. Since TLS is only used during transmission, upon arrival at OES 1403 the email would be immediately decrypted from the TLS encryption. Sent emails can either be stored or not stored on OES 1403. If stored on OES 1403, the emails can either be stored in an encrypted state or an unencrypted state, but if encrypted it would not be TLS encryption. Very rarely are outgoing emails stored on OES 1403 in an encrypted state. OES 1403 then sends the email to the appropriate Incoming Email Server (IES) 1404 as depicted by Arrow 1405. Generally, when an email is transmitted between an Outgoing Server and an Incoming Server, it is transmitted using industry standard protocol, SMTP with TLS. In this example, TLS encryption is used in the transmission of the email between OES 1403 and IES 1404 as represented by Arrow 1405. However, the encrypted email is immediately decrypted from TLS encryption by IES 1404 once received and is almost always stored in an unencrypted state on IES 1404. Once the email has been received by IES 1404, an alert is sometimes sent to the appropriate email account via identification of the appropriate Incoming Email Client (IEC) 1406 as depicted by Arrow 1407. In place of the alert, IES 1404 can also Push the entire email, or part of the email to IEC 1406. Since Arrow 1407 represents a transmission, TLS would generally be used for Arrow 1407. When the owner of the email account checks his IEC 1406 and notices the incoming email alert, or arrival of part or all of the email, he initiates the opening of the email to read the message. If the email has not already been sent, it is then sent to IEC 1406. Regardless if the email was sent from IES 1404 to IEC 1406 immediately upon receipt at IES 1404 (i.e. Pushed), or after the receiver of the email attempts to open it (i.e. Pulled), the email is usually transmitted from IES 1404 to IEC 1406, as depicted by Arrow 1407, in an encrypted state using TLS encryption, but that is not always the case. Either way, upon arrival at IEC 1406 the email is immediately decrypted from TLS encryption by Device 1406. It is important to note that only computers are involved in TLS encryption and decryption—humans are never part of the process.

Still referring to FIG. 14, the biggest security risk is that the email is stored in an unencrypted state, either as an outgoing message on OES 1403 or an incoming message on IES 1404. The reason for this is there is no practical, high probability method to ensure that the EK will be both secure from Hackers and safe from being lost. Once stored, humans must enter the process to decrypt the email if it has been encrypted, and since humans are not 100% reliable, there is risk that an encrypted email will become unrecoverable due to a lost MK. As was previously shown, the invention can overcome this limitation by being configured to enable an outgoing email to be stored on OES 1403, as well as an incoming email on IES 1404, in an encrypted state. In addition, this can be achieved without any changes to existing OECs, OESs, IESs or IECs, or any protocols used in the email process. To all of these existing email components, the integration of SOTI encryption would be transparent. In addition, the invention need not be limited to email, but can also include any other form of electronic or digital communication between two or more parties that is stored on one, both or more OES 1403 devices or IES 1404 devices, such as, but not limited to Text Messaging, video communication, group chat, audio communication, any combination of these methodologies used between two or multiple parties, or any kind of these methods. In addition, the communications need not be stored on either OES 1403 or IES 1404 but can be streamed real-time between the parties.

Figure 15:
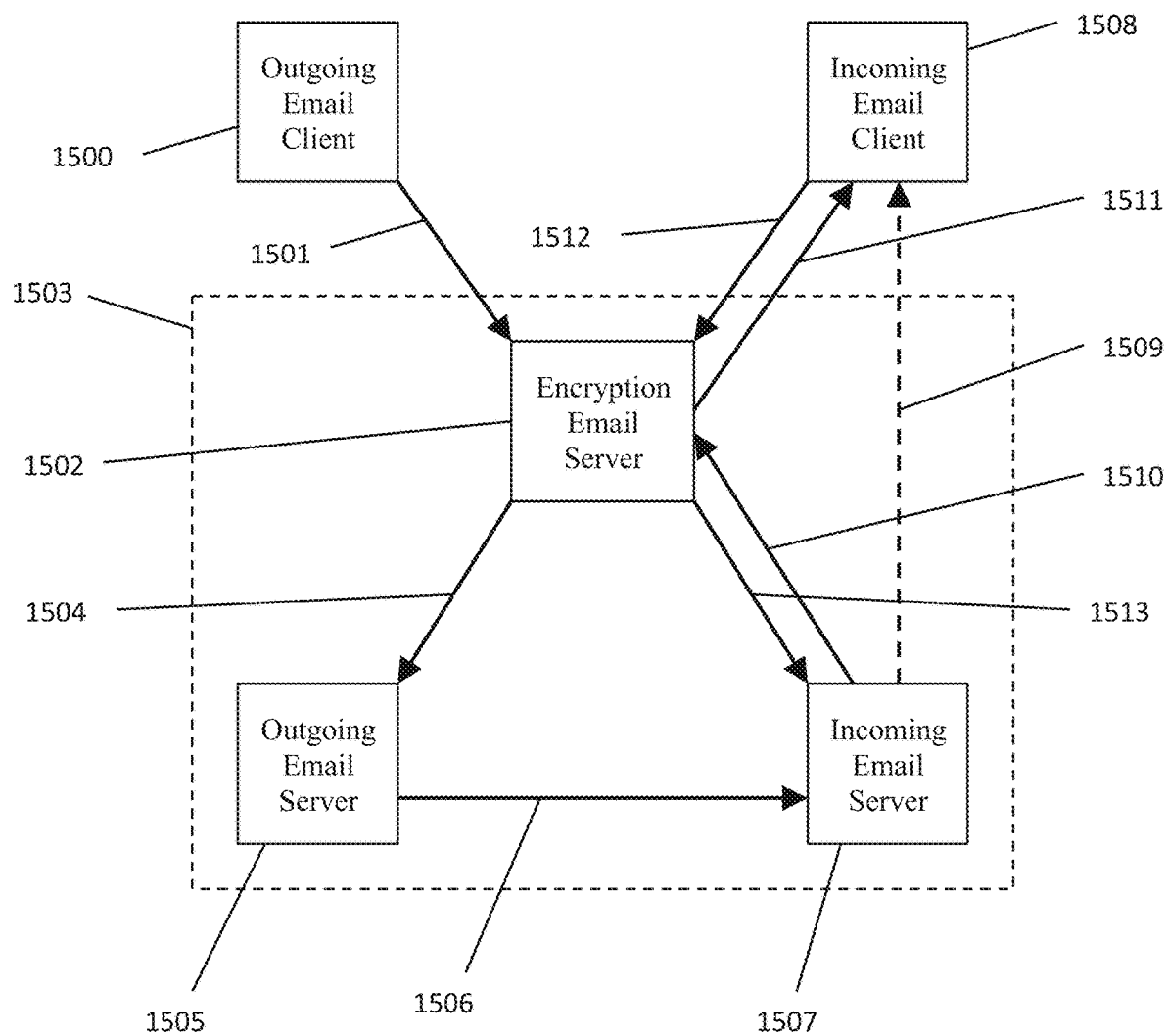
FIG. 15 is a representation of the invention applied to email and other means of electronic communication.

FIG. 15 is a possible configuration of the invention as it applies to the storage of communication between two parties. In this example, email is used as the method of communication but the methodology also applies to any form of electronic, digital or other means of communication, such as but not limited to Text Messaging, Group Chat, voice or voice messages, video and video messages, or any stored recording of voice, text or video conversations.

Still referring to FIG. 15, the person sending the email composes it using her Outgoing Email Client (OEC) 1500, and the email is transmitted on Transmission 1501 to the Encryption Email Server (EES) 1502, which, in this example is the main SOTI and is located on Network 1503. (EES 1502 and SOTI are used interchangeably for FIG. 15.) The outgoing email may or may not be encrypted using TLS during Transmission 1501. If the email has been encrypted during Transmission 1501, it is automatically decrypted of TLS encryption upon arrival at EES 1502. Once the email has been received by EES 1502, and decrypted from TLS encryption if necessary, it is promptly encrypted with SOTI encryption by EES 1502, using a randomly generated, unique encryption key specific to the email, henceforth referred to as an Email Encryption Key (EEK), which could be comprised of two keys in the case of asymmetric encryption, but will generally be a single symmetric encryption key. A copy of the EEK is then given to both the sender's and receiver's SOTI accounts so that EES 1502 can then encrypt each copy for both the sender's and the receiver's accounts using their respective MKs. In the case that there are multiple recipients, a copy of the EEK is given to each recipient's account, which is then encrypted by the each recipient's MK and stored in their respective PVs, while the encrypted email is stored elsewhere. If the recipient does not have an account with EES 1502, and hence does not have an MK, EES 1502 creates a temporary MK for the User along with an entire SOTI account. EES 1502 encrypts the EEK for the email with the PVpuEK and encrypts the PVprEK with the User's temporary MK. The temporary MK is then sent to the new User.

Still referring to FIG. 15, now that the EES 1502 has encrypted the email, EES 1502 continues the Transmission 1504 of the email to the proper Outgoing Email Server (OES) 1505. OES 1505 can be a standard OES that does not have any special configuration to work with EES 1502 and would also work in a standard email process as if EES 1502 did not exist at all. To OES 1505, it does not matter if the contents, and possibly subject line, of the email have been encrypted by EES 1502 or not, and it will not matter to the functioning of OES 1505 if the email has been encrypted by EES 1502 or routed through EES 1502 at all. OES 1505 may either store or not store the outgoing email, but if stored, it is stored in an encrypted state as created by EES 1502 and not in TLS encryption.

Still referring to FIG. 15, if OES 1505 uses TLS in Transmission 1506 of the email to Incoming Email Server (IES) 1507, that encryption is separate and distinct from the SOTI encryption of EES 1502. If Transmission 1506 is sent using TLS encryption on top of the SOTI encryption, when the email arrives at IES 1507 it is promptly automatically decrypted of TLS encryption by IES 1507, but the resulting email is still encrypted with the SOTI encryption. If IES 1507 stores the email it does so in the encrypted state created by the SOTI (or EES 1502).

Still referring to FIG. 15, either a Push or Pull technique can be employed in the communication between IES 1507 and the Incoming Email Client (IEC) 1508. Push occurs when the IES 1507 immediately sends either an alert, a portion of the email or the full email onward to the IEC 1508 immediately upon having received it, either directly to IEC 1508 through Transmission 1509 (in the case of an alert) or indirectly through the EES 1502 through Transmission 1510 and then Transmission 1511. Pull occurs when the IES 1507 does not transmit anything until being contacted by the IEC 1508 indirectly though EES 1502 by Transmission 1512 and then Transmission 1513. In either the Push or Pull situation, the email exists in a state of encryption created by SOTI, as it is sent on Transmission 1510 to the EES 1502. Additionally, the email can be further encrypted using TLS encryption on Transmission 1510 and then decrypted from TLS encryption upon its arrival at EES 1502, where it is still in the state of encryption created by SOTI.

Still referring to FIG. 15, the email is generally not stored at EES 1502. Rather, EES 1502 decrypts the email from the SOTI encryption and then sends it via Transmission 1511 to the IEC 1508. While being transmitted though Transmission 1511, the email may or may not be encrypted using TLS encryption, but if so, the email is automatically decrypted from TLS encryption by IEC 1508 so that in either case, the recipient only sees an unencrypted email.

Still referring to FIG. 15, there are generally two methods that can be used to decrypt the email of SOTI encryption before it is passed from EES 1502 to IEC 1508. First, the recipient's MK is stored in her mail application on the IEC 1508. When the recipient sets up her mail application, she identifies EES 1502 as an intermediary to go between IEC 1508 and IES 1507. One of the industry standard parameters in the email setup process, such as IMAP or POP3, is the entry of a Password and whether or not the Password is stored by the mail application on IEC 1508. SOTI uses this Password as the MK for the email database. When the recipient opens an email session at IES 1507, the mail application passes her MK to EES 1502—EES 1502 does not store the MK. EES 1502 uses the MK to decrypt the relevant EEK, which is stored by SOTI in an encrypted state (The EEK and where it is stored is not shown in FIG. 15), and then uses the unencrypted EEK to decrypt the email, which is being stored by IES 1507 in a SOTI encrypted state, and forwards it to IEC 1508. Before being transmitted via Transmission 1511, the email is generally encrypted using TLS encryption where it is automatically decrypted upon arrival at IEC 1508. Because the MK is stored in the mail application at IEC 1508, and the proxy version of the MK is stored on EES 1502 while the email session with IEC 1508 is open, every email can be automatically decrypted from EES 1502 encryption before being transmitted via Transmission 1511. In the second method of decryption the email application can be set up so that the MK is not stored in the mail application on IEC 1508. In this case, the recipient would need to enter her MK with the start of every new email session.

Still referring to FIG. 15, a variation of this configuration of the invention could include having aspects of previously mentioned configurations whereby portions of Control that execute the encryption and decryption functions are located at IEC 1508, or on OEC 1500, or some combination of both. Or, some portions of Control that execute the encryption and decryption functions could reside on a third party system. In addition, multiple alternate configurations could be produced pursuant to any of the options described in this application.

Still referring to FIG. 15, while this example pertains to email, the invention is not limited to email and can include, but is not limited by, text messaging, audio, video, or any other means of communication or recordings between multiple parties, as well as stored video or audio communications, or any form of streamed content.

The primary advantage of the present invention includes, without limitation, the ability to use encryption or any means of scrambling information with a Key—whereby said Key is the only means by which the information can be descrambled or decrypted—in conjunction with a Virally Connected Network Of Friends (VCNOF) to enable Recovery of the information should the original User lose the Key, but simultaneously preventing any Users who can assist in Recovery from being able to use their viral connection to decrypt the User's data. With a large enough VCNOF, the odds that the VCNOF cannot assist the User in recovering his data rapidly approaches zero percent, thus mitigating the primary risk of using encryption—losing access to one's information by losing the Key. The invention applies to any form of digital or electronic stored or streamed data on any sort of Network, or on a local device unattached to a Network. Another advantage of the invention is that it allows for individual Users to share specific files of encrypted information with other Users, as selected by the owner of the information, or by his rightful proxy, on an individual basis.

In broad embodiment, the present invention is a means of using a virally connected network of Friends to assist each other as a means of being able to recover encrypted data should any single person lose their encryption key, without noticeably risking the security of the encrypted data to any persons with access to the encrypted data or to the Internet, including the virally connected network of Friends.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

We claim:

1. A method for secure storage of encrypted data to be recoverable despite loss of a decryption key, using a computer device comprising a memory, a processor for executing instructions, and instructions stored in the memory for carrying out the method, the method comprising:

identifying a master passphrase for use by the user to access a user account of a data storage system, the data storage system comprising a processor, a memory, and instructions stored in its memory, the data storage system further comprising a respective primary vault storage area for storage of data in a first encrypted state and a respective associated shadow vault storage area for storage of user data in a second encrypted state for each of a plurality of users of the data storage system, access to the user's account's primary vault storage area being secured by the master passphrase;

creating a primary private-public key pair for a user of a data recovery computer system;

transmitting the primary public key of the private-public key pair to the data storage computer system for storage in its memory;

encrypting the user's primary private key of the private-public key pair with the master passphrase;

transmitting the passphrase-encrypted primary private key to the data storage system for storage in the user's account's primary vault storage area;

creating a secondary private-public key pair for the user;

transmitting the secondary public key of the private-public key pair to the data storage computer system for storage in its memory;

generating a recovery key for user;

encrypting the user's secondary private key of the secondary private-public key pair with the recovery key;

transmitting the recovery key-encrypted secondary private key to the data storage system for storage in the user's account's shadow vault storage area;

identifying a plurality of friend users from among a plurality of system users, each of the plurality of friend users being associated with the user;

identifying a desired minimum number of participating friends for key recovery for the user;

tokenizing said recovery key to generate a set of recovery tokens for said plurality of friend users, the set of recovery tokens being generated such that the desired minimum number of recovery tokens are required to re-create the respective recovery key from the minimum number of recovery tokens;

assigning a respective one of the set of recovery tokens to each respective one of said plurality of friend users;

for each of said plurality of friend users:

encrypting the assigned respective one of the set of recovery tokens with a respective one of the plurality of friend users' respective primary public key of that respective one of the plurality of friend users' primary private-public key pair that is received from the data storage system;

storing the primary public-key encrypted assigned respective one of the set of recovery tokens in a respective primary vault storage area of the memory of the data storage system, in association with an account of the respective one of the plurality of friend users;

encrypting the assigned respective one of the set of recovery tokens with the respective one of the plurality of friend users' respective secondary public key of that respective one of the plurality of friend users' secondary private-public key pair, the secondary public key being received from the data storage system; and storing the secondary public-key encrypted assigned respective one of the set of recovery tokens in a respective shadow vault storage area of the memory of the data storage system, in associated with the account of the respective one of the plurality of friend users;

any private data stored by the user at data storage system being stored in the primary vault storage area associated with the user's account as encrypted with the user's primary public key, and being stored in the shadow vault storage area associated with the user's account as encrypted with the secondary public key.

2. The method of claim 1, further comprising:

initiating data recovery by transmitting to the data storage system a data recovery request, in response to which the data storage system transmits data recovery requests to each of the plurality of friend users;

creating a new primary private-public key pair for the user;

identifying a new master passphrase;

transmitting the new primary public key of the private-public key pair to the data storage computer system for storage in its memory in association with the user;

encrypting the user's new primary private key of the private-public key pair with the new master passphrase;

transmitting the new master passphrase-encrypted primary private key to the data storage system for storage in the user's account's primary vault storage area;

creating a new secondary private-public key pair for the user;

transmitting the new secondary public key of the private-public key pair to the data storage computer system for storage in its memory in association with the user;

generating a new recovery key for the user;

encrypting the user's new secondary private key of the new secondary private-public key pair with the new recovery key;

transmitting the new recovery key-encrypted secondary private key to the data storage system for storage in the user's account's shadow vault storage area;

receiving a response from a subset of the plurality of friend users, and for each of the plurality of the responding subset of the plurality of friend users:

receiving from respective friend users a respective newly encrypted recovery token, each respective newly encrypted recovery token being encrypted with each respective user's new primary public key;

receiving from the respective friend user a newly encrypted recovery token encrypted with the user's new secondary public key;

decrypting each newly encrypted recovery token with the respective new primary private key; and after receipt of a desired number of encrypted recovery tokens and after decrypting the desired number of encrypted recovery tokens, reconstructing the recovery key from the desired number of decrypted recovery tokens;

retrieving the recovery key-encrypted secondary private key stored in the user's account's shadow vault;

decrypting the recovery key-encrypted secondary private key stored in the user's account's shadow vault using the recovery key;

retrieving the user's encrypted private data from the user's account's shadow vault; and decrypting the user's encrypted private data retrieved from the user's account's shadow vault with the decrypted secondary private key.

3. The method of claim 2, further comprising:

encrypting the user's private data with the new primary private key;

transmitting the new primary key-encrypted data to the data storage device for storage in the user's new primary vault associated with the user's account;

encrypting the user's private data with the new secondary public key; and transmitting the new public-key encrypted data to the data storage system for storage in the user's new shadow vault associated with the user's account.

4. The system of claim 3, further comprising:

identifying a new plurality of friend users from among the plurality of system users, each of the new plurality of friend users being associated with the user;

identifying a new desired minimum number of participating friends for key recovery for the user;

tokenizing said new recovery key to generate a set of new recovery tokens for said new plurality of friend users, the new set of recovery tokens being generated such that the new desired minimum number of recovery tokens are required to re-create the respective new recovery key from the minimum number of recovery tokens;

assigning a respective one of the new set of recovery tokens to each respective one of said new plurality of friend users;

for each of said plurality of friend users:

encrypting the assigned respective one of the new set of recovery tokens with a respective one of the new plurality of friend users' respective primary public key of that respective one of the plurality of friend users' primary private-public key pair that is received from the data storage system;

storing the primary public-key encrypted assigned respective one of the set of new recovery tokens in each respective primary vault storage area of the memory of the data storage system, in association with an account of the respective one of the new plurality of friend users;

encrypting the assigned respective one of the new set of recovery tokens with the respective one of the new plurality of friend users' respective secondary public key of that respective one of the new plurality of friend users' secondary private-public key pair, the secondary public key being received from the data storage system; and storing the secondary public-key encrypted assigned respective one of the set of recovery tokens in a respective shadow vault storage area of the memory of the data storage system, in association with the account of the respective one of the new plurality of friend users.

5. The method of claim 1, wherein the desired number of recovery tokens needed to reconstruct the recovery key is less than a total number of said plurality of friend users, thereby allowing information recovery if only a fraction of said plurality of friend users assist in recovery.

6. The method of claim 1, wherein said encrypted data comprises at least one of document, video, photograph, email, audio, text messages, blockchain private key, medical record, and digital asset financial transaction data files.

7. The method of claim 1, wherein said a user's encrypted data is stored at a first location and wherein at least one key of said user's private-public key pair is stored at a second location different from said first location.

8. The method of claim 1, wherein at least a portion of at least one of said encrypted data and at least one key of said user's private-public key pair are stored in a distributed format on different computing hardware devices.

9. The method of claim 8, wherein at least one of said different computing hardware devices comprises a client computing device of the user.

10. A method for secure storage and recovery of encrypted data despite loss of a decryption key, using a data storage system comprising a memory, a processor for executing instructions, and instructions stored in the memory for carrying out the method, the method comprising:

providing a respective primary vault storage area for storage of data in a first encrypted state and a respective associated shadow vault storage area for storage of user data in a second encrypted state for each of a plurality of users of the data storage system, access to each user's account's primary vault storage area being secured by a respective master passphrase;

for a plurality of users:

receiving a respective primary public key of a respective private-public key pair from each of said plurality of users and storing it in association with each respective one of said plurality of users;

receiving a respective master passphrase-encrypted primary private key and storing it in each respective user's primary vault storage area;

receiving a respective secondary public key of a respective secondary private-public key pair from each of said plurality of users and storing it in association with each respective one of the plurality of users;

receiving a respective recovery key-encrypted secondary private key and storing it in each respective user's shadow vault storage area;

for at least one particular user:

identifying a plurality of friend users from among the plurality of system users, each of the plurality of friend users being associated with the at least one particular user;

storing in the memory at list identifying each of the plurality of friend users and contact information for communicating with each of said plurality of friend users;

receiving a first plurality of encrypted recovery tokens for said plurality of friend users, the first plurality of recovery tokens being generated such that the desired number of recovery tokens are required to re-create the respective recovery key from the desired number of recovery tokens, each of said first plurality of encrypted recovery tokens for said plurality of friend users being encrypted with a respective one of the plurality of friend users' respective primary public key;

storing each of the first plurality of encrypted recovery tokens in a respective primary vault storage area of the memory, in association with an account of the respective one of the plurality of friend users;

receiving a second plurality of encrypted recovery tokens for said plurality of friend users, each of the second plurality of recovery tokens being encrypted with a respective one of the plurality of friend users' respective secondary public key; and storing each of the second plurality of second plurality of encrypted recovery tokens in a respective shadow vault storage area of the memory, in associated with the account of the respective one of the plurality of friend users;

any private data stored by any user at the data storage system being stored in the primary vault storage area associated with that user's account as encrypted with that user's primary public key, and being stored in the shadow vault storage area associated with that user's account as encrypted with that user's secondary public key.

11. The method of claim 10, further comprising:

in response to receipt of a data recovery request from a user, transmitting data recovery requests to each of the plurality of friend users of the user;

receiving a new primary public key of the private-public key pair and storing it in memory in association with the user;

receiving a new master passphrase-encrypted primary private key and storing it in the user's account's primary vault storage area;

receiving a new secondary public key of the private-public key pair and storing it in memory in association with the user;

receiving a new recovery key-encrypted secondary private key and storing it in the user's account's shadow vault storage area;

creating a new primary vault and a new secondary vault storage area associated with the user's account;

receiving new primary public-key encrypted data and storing it in the user's new primary vault associated with the user's account; and receiving new secondary public-key encrypted data and storing it in the user's new secondary vault associated with the user's account.

12. The method of claim 10, wherein the desired number of recovery tokens needed to reconstruct the recovery key is less than a total number of said plurality of friend users, thereby allowing information recovery if only a fraction of said plurality of friend users assist in recovery.

13. The method of claim 10, wherein said encrypted data comprises at least one of document, video, photograph, email, audio, text messages, blockchain private key, medical record, and digital asset financial transaction data files.

14. The method of claim 10, wherein said user's encrypted data is stored at a first location and wherein at least one key of said user's private-public key pair is stored at a second location different from said first location.

15. The method of claim 10, wherein at least a portion of at least one of said encrypted data and at least one key of said user's private-public key pair are stored in a distributed format on different computing hardware devices.

16. The method of claim 15, wherein at least one of said different computing hardware devices comprises a client computing device of the user.

\* \* \* \* \*